US009081378B2

(12) United States Patent
Lu et al.

(10) Patent No.: US 9,081,378 B2
(45) Date of Patent: Jul. 14, 2015

(54) METHODS AND APPARATUSES FOR ADVANCED MULTIPLE VARIABLE CONTROL WITH HIGH DIMENSION MULTIPLE CONSTRAINTS

(71) Applicant: General Electric Company, Schenectady, NY (US)

(72) Inventors: Manxue Lu, Swampscott, MA (US); Sheldon Carpenter, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 499 days.

(21) Appl. No.: 13/660,005

(22) Filed: Oct. 25, 2012

(65) Prior Publication Data
US 2013/0211550 A1   Aug. 15, 2013

Related U.S. Application Data

(60) Provisional application No. 61/597,316, filed on Feb. 10, 2012.

(51) Int. Cl.
G05B 13/02   (2006.01)
G05B 11/32   (2006.01)
G05B 13/04   (2006.01)

(52) U.S. Cl.
CPC ............... *G05B 11/32* (2013.01); *G05B 13/04* (2013.01)

(58) Field of Classification Search
CPC ... H04L 5/0048; H04B 7/0413; H04B 7/0452
USPC .............................................. 700/19, 53, 54
See application file for complete search history.

(56) References Cited

U.S. PATENT DOCUMENTS

| 2002/0022892 | A1* | 2/2002 | Bergold et al. | ................ 700/19 |
| 2004/0107013 | A1 | 6/2004 | Fuller et al. | |
| 2007/0162161 | A1 | 7/2007 | Kumar | |

FOREIGN PATENT DOCUMENTS

EP   1426840 A1   6/2004

OTHER PUBLICATIONS

Search Report and Written Opinion from corresponding PCT Application No. PCT/US2013/025127, dated Jun. 3, 2013.
Abou-Jeyab, Roia A. et al., "Constrained Multivariable Control of Fluidized Catalytic Cracking Process Using Linear Programming", Chemical Engineering Research and Design, Part A, Institution of Chemical Engineers, XX, vol. 10, No. 3, Apr. 1, 2001, pp. 274-282, XP022536037, ISSN: 0263-8762.
Wu, Meng C. et al., "Weighted switching lifted digital redesign with state saturation for cascaded analogue systems", IMA Journal of Mathematical Control & Information, vol. 20, No. 1, Jan. 1, 2003, pp. 65-87, XP002442982, ISSN: 0265-0754.

* cited by examiner

*Primary Examiner* — Mohammad Ali
*Assistant Examiner* — Sheela S Rao
(74) *Attorney, Agent, or Firm* — General Electric Company; Pamela A. Kachur

(57) ABSTRACT

A method and apparatus for multiple variable control of a physical plant with high dimension multiple constraints, includes: mathematically decoupling primary controlled outputs of a controlled physical plant from one another and shaping the pseudo inputs/controlled outputs desired plant dynamics; tracking primary control references and providing pseudo inputs generated by desired primary output tracking for selection; mathematically decoupling constraints from one another; mathematically decoupling constraints from non-traded off primary controlled outputs of the controlled physical plant; shaping the pseudo inputs/constraint outputs desired plant dynamics; tracking constraint control limits; providing pseudo inputs generated by desired constraint output tracking for selection; selecting the most limiting constraints and providing the smooth pseudo inputs for the decoupled primary control; and controlling the physical plant using the decoupled non-traded off primary controlled outputs and the decoupled selected most limiting constraints.

17 Claims, 6 Drawing Sheets

METHODS AND APPARATUSES FOR ADVANCED MULTIPLE VARIABLE CONTROL WITH HIGH DIMENSION MULTIPLE CONSTRAINTS

CROSS REFERENCE TO RELATED APPLICATIONS

The current application claims priority to U.S. Provisional Application Ser. No. 61/597,316, filed Feb. 10, 2012, the entire disclosure of which is incorporated herein by reference.

BACKGROUND OF THE INVENTION

The present disclosure pertains to control system design and operation when the controlled system includes multiple control targets with multiple constraints.

In a control system having more than one primary target to be controlled for multiple primary control objectives, such as thrust, fan operability, core operability, etc. (for a jet engine, for example), the control system will have multiple inputs and multiple outputs to control. Such a control system should address the challenge of multi-variable control with multiple constraints, particularly when the primary control objectives have high transient and dynamic requirements. The challenge fundamentally is a coordinated control to maintain primary control objectives as much as possible while enforcing a selected set of active constraints that can satisfy all potentially active constraints.

Traditionally, single-input-single-output (SISO) control is used for one primary control objective—for example in a gas turbine engine, fan speed only. The concerned constraints are converted to the control actuator rate—fuel rate, respectively, the constraint demanding most fuel rate is selected as most limiting constraint and enforced. Here, there is an assumption that fuel rate is always proportional to fan speed change, and fan speed changes always align up and dominate the thrust response and operability. This may be true in many operating conditions, but it is not true for certain operating conditions, such as supersonic operating area for conventional engine applications, not to mention non-conventional engine applications, such as powered lift operation.

Multiple constraints may be in one subset only, that is, at same time, only one primary controlled output needs to be traded off. There are cases, however, in which multiple constraints are in two or more subsets that require two or more primary controlled outputs to be traded off. Certainly, at most, the number of the subsets should be equal to the number of the primary control handles. For example, in the gas turbine engine example, if both "maximum core speed" and "maximum exhaust temperature" constraints are active, it may be necessary to trade off both primary controlled outputs, "fan speed" and "pressure ratio," for better thrust and operability performance, while enforcing both the "maximum core speed" and "maximum exhaust temperature" constraints. It is a challenge to control multiple variables with higher dimension multiple constraints.

Previous approaches to solve this problem have either greatly oversimplified the problem or added substantial complexity. The oversimplified approach ignored fundamental confounding in the relationships between the controlled plant inputs and the performance trade-off and control mode selection decisions that must be made. This limited its applicability to certain 2×2 multi-input-multi-output (MIMO) systems, and does not represent a robust solution for higher dimension MIMO systems. The overly complicated approaches coupled the constraint control with the primary control, usually lost expected control objectives priority, and sacrificed the physical meaning, robustness, deterministicness, and maintainability of the control solution.

BRIEF DESCRIPTION OF THE INVENTION

The present disclosure provides a control system design methodology that incorporates a simple, deterministic, robust and systematic solution with explicit physical meaning for the advanced multi-variable control, with high dimension multiple constraint problems where the trade-off primary control outputs are pre-determined based on plant physics (for example, engine, or other plant characteristics depending upon the application). The disclosed methodology provides a fundamental solution for the problem of MIMO control with multiple constraints and/or multiple high dimension constraints, it follows that the resulted solution well coordinates the multi-variable control with the selected multiple active constraints enforcement such that, when not constrained, the primary multi-variable control has its optimized performance as designed; when constrained, the proper most limiting active constraints are correctly selected and naturally enforced by replacing the pre-determined trade-off primary control outputs, respectively. If the most limiting constraints are enforced, then the rest of the constraints can be automatically satisfied. Together they make the overall system still have desired primary control performance while running under the enforced constraints, and the traded-off primary control outputs have natural fall-out.

Consider the Multiple Variable Control with Multiple Constraints as a whole space. One subspace is a class with only one subset of constraints to be active and only one primary control output to be traded off—this is single-dimension multiple constraints case. The rest of the space is with two or more subsets of constraints to be active and two or more primary controls to be traded off—this is high dimension multiple constraints case. The control system design methodology provided by this disclosure is not only for single dimension multiple constraints case but also for high dimension multiple constraints case.

The control system design methodology provided by this disclosure results in a simple physics based selection logic, and a mathematically decoupled primary control with decoupled constraint control. That is, the primary controlled outputs are mathematically decoupled from one another, the selected constraints in control are mathematically decoupled from one another, and the selected constraints are mathematically decoupled from primary controlled outputs. It follows that each decoupled control target can be designed via single-input-single-output (SISO) control approaches for its specific performance requirements.

According to the current disclosure, an embodiment of a control system for a physical plant (such as, for example and without limitation, a gas turbine engine control, flight control, satellite control, rocket control, automotive control, industrial process control) may include: a set of control reference signals; a set of controlled output feedback signals from the physical plant; a multiple input multiple output (MIMO) primary decoupling controller providing control command derivatives to the integral action (and enabling the shaping of desired robust control of the primary control outputs); a set of SISO lead/lag controllers that can extend the bandwidths of decoupled primary SISO loops, respectively; a set of decoupled SISO controllers for controlled outputs tracking that receive primary controlled output tracking errors and provide desired pseudo inputs, respectively; a multiple input multiple output (MIMO) constraint decoupling controller decoupling the constraints from one another, decoupling the constraints from the non-traded off primary controlled outputs, and providing pseudo inputs based on the desired constraint responses for the Selection Logic (introduced below); a set of decoupled SISO controllers for constraint outputs tracking that receive constraint output tracking errors and shape desired constraint responses, respectively; a Selection Logic which compares the pseudo inputs generated by each subset of constraints and the pseudo input generated by the primary controlled output associated with that subset, selects the most limiting constraint for that subset, and determines the final pseudo inputs to go into the SISO Lead/Lag and MIMO Primary Decoupling Controller. With such an architecture, the integral action becomes a set of common SISO integrators shared by primary control and constraint control.

According to the current disclosure, a control system for a physical plant, includes: an integral action control unit providing control signals for a physical plant; a multiple-input-multiple-output (MIMO) primary decoupling controller providing control command derivatives to the integral action control unit and thereby forming at least a decoupled controlled plant; and a multiple-input-multiple-output (MIMO) constraint decoupling controller decoupling constraint outputs from the physical plant and providing pseudo inputs to the above decoupled controlled plant. In a more detailed embodiment, a selection logic section for selecting pseudo inputs for the primary decoupling controller from those pseudo inputs calculated by: 1) the MIMO constraint decoupling controller and the constraint tracking controller; 2) the primary MIMO decoupling controller and the output tracking controller. In a further detailed embodiment, the control system further includes a set of decoupled single-input-single-output (SISO) controlled output tracking controllers receiving controlled output tracking error signals and providing pseudo input signals to the decoupled controlled plant. In a further detailed embodiment, the selection logic compares the pseudo inputs from the MIMO constraint decoupling controller and the pseudo input signals from the SISO controlled output tracking controllers and selects at least one most limiting constraint to determine pseudo inputs to the (SISO) lead/lag controllers. Alternatively, or in addition, the selection logic compares the pseudo inputs from the MIMO constraint decoupling controller and the pseudo input signals from the SISO controlled output tracking controllers and selects at least one most limiting constraint to determine pseudo inputs to (MIMO) primary decoupling controller.

In an embodiment, the control system further includes a set of single-input-single-output (SISO) lead/lag controllers to extend the bandwidths of decoupled primary SISO control loops, providing v-dot-star to the primary decoupling controller. Alternatively, or in addition, the MIMO constraint decoupling controller decouples the constraints from the non-traded off primary controlled outputs by rejecting non-traded off primary controlled outputs as known disturbance inputs. Alternatively, or in addition, the MIMO constraint decoupling controller decouples constraint outputs from one another, and decouples the constraints from the non-traded off primary controlled outputs. Alternatively, or in addition, the control system further includes a set of single-input-single-output (SISO) constraint output tracking controllers that receive constraint output tracking errors from the physical plant and shape desired constraint responses based on the MIMO constraint decoupling controller. Such constraint output tracking errors may be determined, at least in part, based upon the differences between predetermined constraint limits and constraint outputs.

According to the current disclosure a method for multiple variable control of a physical plant with not only multiple inputs and multiple outputs but also high dimension multiple constraints, includes the steps of: decoupling the multiple primary controlled outputs from one another, the step of decoupling the multiple primary controlled outputs uses a multi-input-multi-output (MIMO) primary decoupling controller; decoupling the multiple constraints from one another and decoupling the multiple constraints from non-traded off primary controlled outputs, the step of decoupling the multiple constraints involves a multi-input-multi-output (MIMO) constraint decoupling controller; and providing pseudo inputs, where the pseudo outputs generated by constraints are comparable to the pseudo outputs generated by the primary controlled outputs, to the MIMO primary decoupling controller. The method further includes a step of selecting the most limiting constraint(s) for the MIMO primary decoupling controller; where the step of selecting the most limiting constraint includes the step of comparing the pseudo inputs generated by given subsets of constraints and the pseudo input generated by the primary controlled output associated with that subset, and selecting the most limiting constraint based, at least in part, on those comparisons. The MIMO primary decoupling controller may provide decoupled control using dynamics inversion. The method may further include a step of extending the bandwidths of decoupled primary control loops using a set of single-input-single-output (SISO) lead/lag controllers upstream of the MIMO primary decoupling controller. And the step of decoupling the multiple constraints from non-traded off primary controlled outputs includes a step of rejecting the non-traded off primary controlled outputs as known disturbance inputs.

According to the current disclosure a method for multiple variable control of a physical plant with not only multiple inputs and multiple outputs but also high dimension multiple constraints, includes the steps of: mathematically decoupling primary controlled outputs of a controlled physical plant from one another; mathematically decoupling constraints from one another; mathematically decoupling selected constraints from non-traded off primary controlled outputs of the controlled physical plant; and controlling the physical plant using the decoupled primary controlled outputs and/or the decoupled selected constraints which are decoupled from the non-traded off primary controlled outputs. Such a method further includes a step of selecting one or more most limiting constraints.

Development of the advanced multiple variable control with high dimension multiple constraints will now be introduced and discussed.

DETAILED DESCRIPTION

The present disclosure provides a control system design methodology that incorporates a simple, deterministic, robust and systematic solution with explicit physical meaning for the advanced multi-variable control, with high dimension multiple constraints problems where the trade-off primary control outputs are pre-determined based on plant physics and performance requirements (for example, engine, or other plant characteristics depending upon the application). The solution well coordinates the multi-variable control with the selected multiple active constraints enforcement such that, when not constrained, the primary multi-variable control has its optimized performance as designed; when constrained, the proper most limiting active constraints are correctly selected and naturally enforced by replacing the pre-determined trade-off primary control outputs, respectively. If the most limiting constraints are enforced, then the rest of the constraints can be automatically satisfied. Together they make the overall system still have desired primary control performance while running under the enforced constraints, and the traded-off primary control outputs have natural fall-out.

When the primary multiple variable control is not constrained, it should run to its desired performance. When the primary control is constrained, the constraint control should keep the most limiting constraints staying within their limits; and at the same time, since constraint control uses some or all primary control handles, the primary control should be traded off in an acceptable way while the intended non-traded-off part of primary control should be not impacted by enforcing the most limiting constraints.

Based on the above control design goals, first, the primary multiple variable is designed to have decoupled input/output mapping. Then multiple constraint control is designed based on the new controlled plant resulted from the primary control design such that the constraint control not only decouples constraints from one another, decouples constraints from the non-traded off primary controlled output(s), also provides the pseudo inputs that are comparable to the pseudo inputs generated by the primary controlled outputs. With such an architecture and pseudo inputs as key link, both MIMO primary control and MIMO constraint control lead to simple deterministic SISO loop design.

Figure 6:
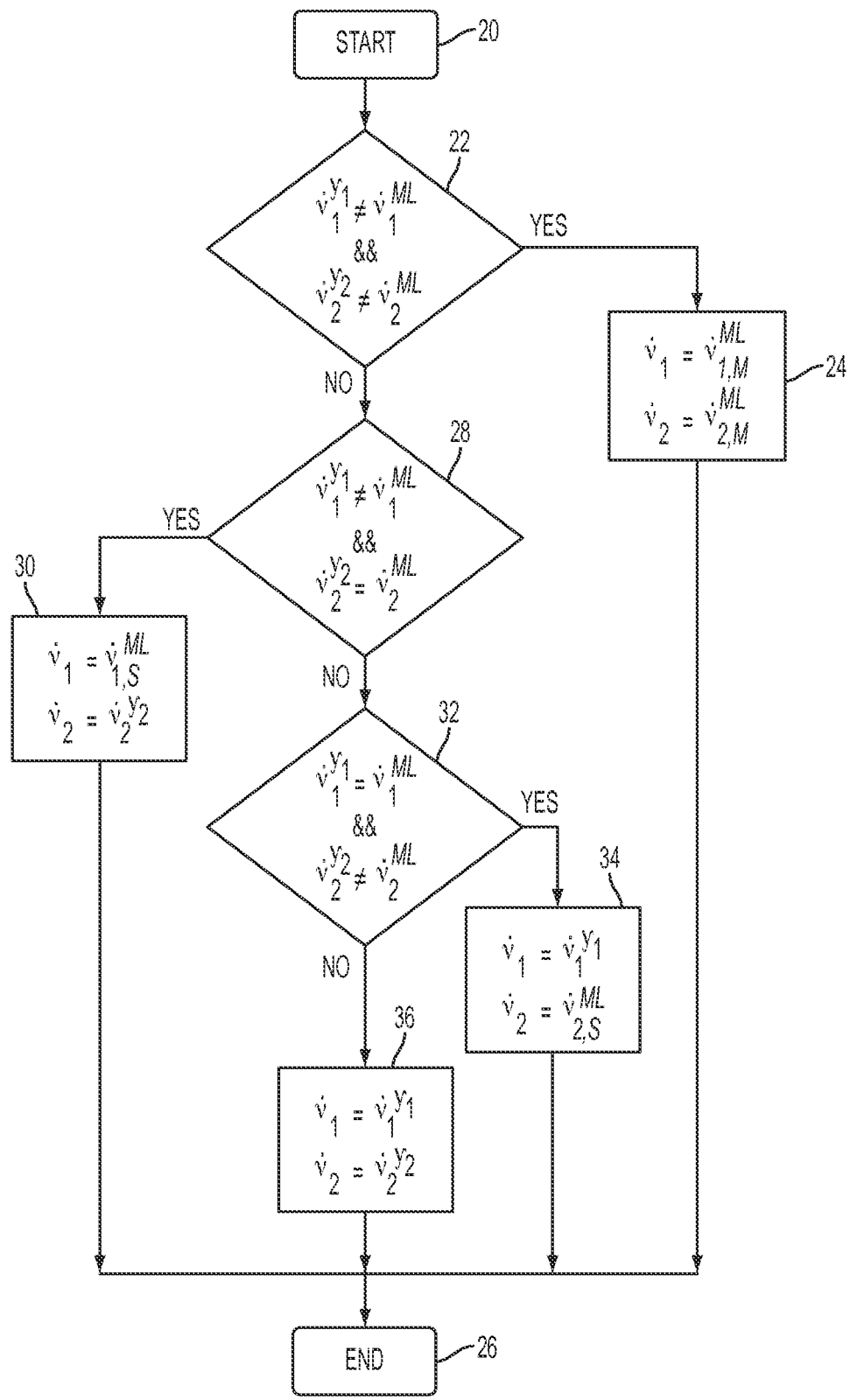
FIG. 6 is a flow-chart representation of an exemplary selection logic process for high dimension constraint sets according to the current disclosure.

Mechanisms for obtaining a simple, deterministic, robust and systematic solution with explicit physical meaning for the advanced multi-variable control with multiple constraint problems include: (1) To classify constraint candidates into specific subsets, and each constraint subset is corresponding to one trade-off target of primary control outputs; (2) The number of constraint subsets should be equal to or less than the primary control handles; (3) For high dimension multiple constraints, i.e., constraints from different subsets to be active at same time, they should be decoupled before constructing the SISO constraint controllers in each subset; (4) Each constraint subset is calculating its trade-off target—the specific pseudo input based on each of the constraint regulators in this constraint subset; (5) MIMO primary control should decouple the primary controlled outputs; (6) Therefore, multi-dimension constraints should be decoupled one dimension from another dimension and decoupled from the non-traded off primary controlled outputs—it follows that the above constraint controller is a decoupled SISO regulator with desired dynamics based on constraint MIMO dynamics inversion with respect to its relative degree; (7) The most limiting constraint should be resulted from comparing the pseudo inputs generated by the constraints in each subset and the associated primary controlled output based on pre-determined selection logic; (8) The pseudo input generated by the most limiting constraint controller is applied to replace the primary control that is pre-determined to trade off; (9) The most limiting constraint(s) active/inactive transition is managed by the selection logic smoothly (Example is as shown in FIG. 6).

The design procedure and approaches of the Advanced Multiple Variable Control with High Dimension Multiple Constraints is described below.

The Original Controlled Plant

Without loss of generality, assume the original controlled plant is:

$$x_{k+1} = f(x_k, \dot{u}_k, d_k)$$

$$y_k = h(x_k, \dot{u}_k, d_k)$$

At sample k, the system states $x_k$, the inputs $\dot{u}_{k-1}$, and the disturbances $d_k$ are known. Thus, the deviation variables are expressed about this current operating condition, i.e. $x_k$, $\dot{u}_{k-1}$, $d_k$, $y_k^- = h(x_k, \dot{u}_{k-1}, d_k)$.

Define the deviation variables from these conditions, $$\tilde{x}_j = x_j - x_k$$

$$\dot{\tilde{u}} = \dot{u}_j - \dot{u}_{k-1}$$

$$\tilde{d}_j = d_j - d_k$$

$$\tilde{y}_j = y_j - y_k^-$$

The local linearized model of the system in terms of deviation variables may be derived $$\begin{aligned} x_{k+1} - x_k &= \tilde{x}_{k+1} \\ &= f(x_k, u_{k-1}, d_k) - x_k + \frac{\partial f}{\partial x}\bigg|_{k,k-1}(x_k - x_k) + \frac{\partial f}{\partial \dot{u}}\bigg|_{k,k-1} \\ &\quad (\dot{u}_k - \dot{u}_{k-1}) + \frac{\partial f}{\partial d}\bigg|_{k,k-1}(d_k - d_k) \\ &= F_k + A\tilde{x}_k + B\dot{\tilde{u}}_k + B_d\tilde{d}_k \end{aligned}$$

Approximate $F_k \approx \hat{x}_k = x_k - x_{k-1}$, and it is treated as a known initial condition for $\tilde{x}_{k+1}$ at sample k, or, autonomous response of the system states over one control sample free from any control action update, i.e. $\dot{\tilde{u}}_k = 0$.

$$\begin{aligned} y_k - y_k^- &= \tilde{y}_k \\ &= h(x_k, u_{k-1}, d_k) - y_k^- + \frac{\partial h}{\partial x}\bigg|_{k,k-1}(x_k - x_k) + \frac{\partial h}{\partial \dot{u}}\bigg|_{k,k-1} \\ &\quad (\dot{u}_k - \dot{u}_{k-1}) + \frac{\partial h}{\partial d}\bigg|_{k,k-1}(d_k - d_k) \\ &= C\tilde{x}_k + D_u\dot{\tilde{u}}_k + D_d\tilde{d}_k \end{aligned}$$

The generic perturbation model based on plant dynamics partials is presented below (for example, it can be based on engine dynamics partials from cycle study):

$$\tilde{x}(k+1) = A\tilde{x}(k) + B\dot{\tilde{u}}(k) + B_d\tilde{d}(k) + F_k$$

$$\tilde{y}(k) = C\tilde{x}(k) + D_d\tilde{d}(k)$$

$$\tilde{y}_c(k) = C_c\tilde{x}(k) + D_{cd}\tilde{d}(k)$$

Where $\tilde{x} \in R^{n \times 1}$, $\dot{\tilde{u}} \in R^{m \times 1}$, $\tilde{y} \in R^{m \times 1}$, $\tilde{d} \in R^{q \times 1}$, $\tilde{y}_c \in R^{p \times 1}$, $p > m$.

Approximations:

$$d(k)-d(k-1)=d(k+1)-d(k),\ldots$$

$$\tilde{d}(k+1)=d(k+1)-d(k)\approx \hat{d}(k),$$

Without loss of generality and for clear formulation of the design process, assume that the primary control has 3 control inputs and 3 outputs, i.e. 3×3 control, $$\dot{u}=\begin{bmatrix}\dot{u}_1\\\dot{u}_2\\\dot{u}_3\end{bmatrix}, y=\begin{bmatrix}y_1\\y_2\\y_3\end{bmatrix}, y_c=\begin{bmatrix}y_{c1}\\y_{c2}\\y_{c3}\\y_{c4}\end{bmatrix}.$$

And assume that $y_1$ has relative degree 3, and $y_2$ and $y_3$ both have relative degree 2; and $y_{c1}$ has relative degree 3, and $y_{c2}$, $y_{c3}$ and $y_{c4}$ both have relative degree 2.

The Primary Control Based on Original Controlled Plant

Use relative degree concept and dynamics inversion approach, the primary control output response is derived below.

Assume the relative degree of $\tilde{y}_i$ to $\dot{\tilde{u}}$ is $Rd_i>1$, then the primary controlled output response are:

$$\tilde{y}_i(k+1) = C_i A \tilde{x}(k) + C_i B \tilde{u}(k) + C_i B_d \tilde{d}(k) + C_i F_k + D_{di}\tilde{d}(k+1)$$
$$= C_i F_k + D_{di}\hat{d}(k)$$
$$= K_{f,i}^1 F_k + K_{d,i}^1 \hat{d}(k),$$

$$\tilde{y}_i(k+2) = C_i A^2 \tilde{x}(k) + C_i AB \tilde{u}(k) + C_i AB_d \tilde{d}(k) + C_i B_d \tilde{d}(k+1) + C_i(A+I)F_k + D_{di}\tilde{d}(k+2)$$
$$= C_i(A+I)F_k + (C_i B_d + 2D_{di})\hat{d}(k)$$
$$= K_{f,i}^2 F_k + K_{d,i}^2 \hat{d}(k),$$

$$\ldots$$

$$\tilde{y}_i(k+Rd_i) = C_i A^{Rd_i}\tilde{x}(k) + C_i A^{Rd_i-1} B\tilde{u}(k) +$$
$$\begin{pmatrix} C_i A^{Rd_i-1}B_d\tilde{d}(k) + \ldots + \\ C_i B_d \tilde{d}(k+Rd_i-1) + \ldots + D_{di}\tilde{d}(k+Rd_i)\end{pmatrix} +$$
$$C_i(A^{Rd_i-1}+\ldots+A+I)F_k$$
$$= E_i \tilde{u}(k) + K_{f,i}F_k + K_{d,i}\hat{d}(k),$$

Where $E_i = C_i A^{Rd_i-1}B$, $K_{f,i} = C_i(A^{Rd_i-1}+\ldots+A+I)$,
$K_{d,i} = C_i A^{Rd_i-2}B_d + \ldots + (Rd_i-1)\cdot C_i B_d + Rd_i \cdot D_{di}.$ The current controlled output response in general is described below:

$$\tilde{y}(k+Rd) = E\tilde{u}(k) + K_f F_k + K_d \hat{d}(k)$$

Where $$\tilde{y}(k+Rd) = \begin{bmatrix}\tilde{y}_1(k+3)\\\tilde{y}_2(k+2)\\\tilde{y}_3(k+2)\end{bmatrix},$$

$$E = \begin{bmatrix}E_1\\E_2\\E_3\end{bmatrix} = \begin{bmatrix}C_1 A^2 B\\C_2 AB\\C_3 AB\end{bmatrix},$$

$$K_f = \begin{bmatrix}K_{f,1}\\K_{f,2}\\K_{f,3}\end{bmatrix} = \begin{bmatrix}C_1(A^2+A+I)\\C_2(A+I)\\C_3(A+I)\end{bmatrix},$$

$$K_d = \begin{bmatrix}K_{d,1}\\K_{d,2}\\K_{d,3}\end{bmatrix} = \begin{bmatrix}C_1(A+2I)B_d+3D_{d1}\\C_2 B_d + 2D_{d2}\\C_3 B_d + 2D_{d2}\end{bmatrix}.$$

Further, the dynamics of controlled output y(k) is desired to track the reference $y_r(k)$, i.e., let $$\hat{y}_i(k+j)=y_{ri}(k+j)-y_i(k), i=1,2,3; j=0,\ldots,Rd_i,$$

the desired control tracking performance is shaped below:

$$(\hat{y}_1(k+3)-\tilde{y}_1(k+3))+k_{1,2}(\hat{y}_1(k+2)-\tilde{y}_1(k+2))+k_{1,1}(\hat{y}_1(k+1)-\tilde{y}_1(k+1))+k_{1,0}(\hat{y}_1(k)-\tilde{y}_1(k))=0$$

$$(\hat{y}_2(k+2)-\tilde{y}_2(k+2))+k_{2,1}(\hat{y}_2(k+1)-\tilde{y}_2(k+1))+k_{2,0}(\hat{y}_2(k)-\tilde{y}_2(k))=0$$

$$(\hat{y}_3(k+2)-\tilde{y}_3(k+2))+k_{3,1}(\hat{y}_3(k+1)-\tilde{y}_3(k+1))+k_{3,0}(\hat{y}_3(k)-\tilde{y}_3(k))=0$$

Properly choose $k_{i,j}$, $i=1,\ldots,3; j=0,\ldots,Rd_i-1$ such that the following polynomial $$\rho^{Rd_i}+\ldots+k_{i,j}\rho^j+\ldots+k_{i,1}\rho+k_{i,0}=0 \qquad \text{(Eq. 130)}$$

has its eigenvalues all within the unit circle, then the primary control dynamics is asymptotically stable.

Usually $y_{ri}(k)$ is time-varying, the approximated $\tilde{y}_{ri}(k+j)$, $j=1,\ldots,Rd_i$ can be obtained by using extrapolation (such as linear format, exponential format, etc.). Let $\tilde{y}_{ri}(k)=y_{ri}(k)-y_{ri}(k-1)$. Approximate $\tilde{y}_{ri}(k+1)\approx\alpha_i\tilde{y}_{ri}(k)$, $\tilde{y}_r(k+2)\approx\alpha^2\tilde{y}_r(k),\ldots$.

The desired controlled output tracking response:

$$\tilde{y}_1(k+3) = \hat{y}_1(k+3) + k_{1,2}(\hat{y}_1(k+2)-\tilde{y}_1(k+2)) +$$
$$k_{1,1}(\hat{y}_1(k+1)-\tilde{y}_1(k+1)) + k_{1,0}(\hat{y}_1(k)-\tilde{y}_1(k))$$
$$= [\hat{y}_1(k+3)+k_{1,2}\hat{y}_1(k+2)+k_{1,1}\hat{y}_1(k+1)+k_{1,0}\hat{y}_1(k)] -$$
$$[k_{1,2}\tilde{y}_1(k+2)+k_{1,1}\tilde{y}_1(k+1)]$$
$$= [K_{e1}\hat{y}_1^*(k)] - \begin{bmatrix}k_{1,2}(K_{f,1}^2 F_k + K_{d,1}^2 \hat{d}(k)) +\\ k_{1,1}(K_{f,1}^1 F_k + K_{d,1}^1 \hat{d}(k))\end{bmatrix}$$
$$= K_{e1}\hat{y}_1^*(k) - K_{df,1}F_k - K_{dd,1}\hat{d}(k)$$

$$\tilde{y}_2(k+2) = \hat{y}_2(k+2) + k_{2,1}(\hat{y}_2(k+1)-\tilde{y}_2(k+1)) +$$
$$k_{2,0}(\hat{y}_2(k)-\tilde{y}_2(k))$$
$$= [\hat{y}_2(k+2)+k_{2,1}\hat{y}_2(k+1)+k_{2,0}\hat{y}_2(k)] -$$
$$[k_{2,1}\tilde{y}_2(k+1)]$$
$$= [K_{e2}\hat{y}_2^*(k)] - [k_{2,1}(K_{f,2}^1 F_k + K_{d,2}^1 \hat{d}(k))]$$
$$= K_{e2}\hat{y}_2^*(k) - K_{df,2}F_k - K_{dd,2}\hat{d}(k)$$

-continued $$\tilde{y}_3(k+2) = \hat{y}_3(k+2) + k_{3,1}(\hat{y}_3(k+1) - \tilde{y}_3(k+1)) + k_{3,0}(\hat{y}_3(k) - \tilde{y}_3(k))$$
$$= [\hat{y}_3(k+2) + k_{3,1}\hat{y}_3(k+1) + k_{3,0}\hat{y}_3(k)] - [k_{3,1}\tilde{y}_3(k+1)]$$
$$= [K_{e3}\hat{y}_3^*(k)] - [k_{3,1}(K_{f,3}^1 F_k + K_{d,3}^1 \hat{d}(k))]$$
$$= K_{e3}\hat{y}_3^*(k) - K_{df,3} F_k - K_{dd,3}\hat{d}(k)$$

Where $$K_{e1} = [1 \quad k_{1,2} \quad k_{1,1} \quad k_{1,0}],$$

$$\hat{y}_1^*(k) = \begin{bmatrix} y_{r1}(k) - y_1(k) \\ y_{r1}(k) - y_1(k) \\ y_{r1}(k) - y_1(k) \\ y_{r1}(k) - y_1(k) \end{bmatrix} + \begin{bmatrix} \alpha_1^3 \tilde{y}_{r1}(k) \\ \alpha_1^2 \tilde{y}_{r1}(k) \\ \alpha_1 \tilde{y}_{r1}(k) \\ 0 \end{bmatrix},$$

$$K_{df,1} = (k_{1,2}K_{f,1}^2 + k_{1,1}K_{f,1}^1),$$

$$K_{dd,1} = (k_{1,2}K_{d,1}^2 + k_{1,1}K_{d,1}^1);$$

$$K_{e2} = [1 \quad k_{2,1} \quad k_{2,0}],$$

$$\hat{y}_2^*(k) = \begin{bmatrix} y_{r2}(k) - y_2(k) \\ y_{r2}(k) - y_2(k) \\ y_{r2}(k) - y_2(k) \end{bmatrix} + \begin{bmatrix} \alpha_2^2 \tilde{y}_{r2}(k) \\ \alpha_2 \tilde{y}_{r2}(k) \\ 0 \end{bmatrix},$$

$$K_{df,2} = k_{2,1}K_{f,2}^1,$$

$$K_{dd,2} = k_{2,1}K_{d,2}^1;$$

$$K_{e3} = [1 \quad k_{3,1} \quad k_{3,0}],$$

$$\hat{y}_3^*(k) = \begin{bmatrix} y_{r3}(k) - y_3(k) \\ y_{r3}(k) - y_3(k) \\ y_{r3}(k) - y_3(k) \end{bmatrix} + \begin{bmatrix} \alpha_3^2 \tilde{y}_{r3}(k) \\ \alpha_3 \tilde{y}_{r3}(k) \\ 0 \end{bmatrix},$$

$$K_{df,3} = k_{3,1}K_{f,3}^1,$$

$$K_{dd,3} = k_{3,1}K_{d,3}^1;$$

If $y_{ri}(k)$ is constant, $$\hat{y}_1^*(k) = \begin{bmatrix} y_{r1}(k) - y_1(k) \\ y_{r1}(k) - y_1(k) \\ y_{r1}(k) - y_1(k) \\ y_{r1}(k) - y_1(k) \end{bmatrix},$$

$$\hat{y}_2^*(k) = \begin{bmatrix} y_{r2}(k) - y_2(k) \\ y_{r2}(k) - y_2(k) \\ y_{r2}(k) - y_2(k) \end{bmatrix},$$

$$\hat{y}_3^*(k) = \begin{bmatrix} y_{r3}(k) - y_3(k) \\ y_{r3}(k) - y_3(k) \\ y_{r3}(k) - y_3(k) \end{bmatrix}.$$

Note that the free response $y_i^f$ is not dependent on $\tilde{u}(k)$, only depend on $F_k$ and $\hat{d}(k)$. Further the desired controlled output response in a compact way, $$\tilde{y}(k+Rd) = K_{RE}\hat{y}^*(k) - K_{df}F_k - K_{dd}\hat{d}(k))$$

Where $$K_{RE} = \begin{bmatrix} K_{e1} & 0 & 0 \\ 0 & K_{e2} & 0 \\ 0 & 0 & K_{e3} \end{bmatrix},$$

$$\hat{y}^*(k) = \begin{bmatrix} \hat{y}_1^*(k) \\ \hat{y}_2^*(k) \\ \hat{y}_3^*(k) \end{bmatrix},$$

$$K_{df} = \begin{bmatrix} K_{df,1} \\ K_{df,2} \\ K_{df,3} \end{bmatrix},$$

$$K_{dd} = \begin{bmatrix} K_{dd,1} \\ K_{dd,2} \\ K_{dd,3} \end{bmatrix}$$

Define the pseudo input as:

$$\dot{v}_i(k) = K_{RE}(i,i)\hat{y}_i^*(k)$$

Compare the above desired controlled output response with the current controlled output response, the primary decoupling control based on dynamics inversion is obtained below:

$$E\dot{\tilde{u}} = \dot{v}(k) - (K_{df} + K_f)F_k - (K_{dd} + K_d)\hat{d}(k)$$

$$\tilde{u}(k) = K_V \dot{v}(k) + K_F F_k + K_D \hat{d}(k)$$

The resulting control decouples the SISO loop $\dot{v}_i \to y_i$ from SISO loop $\dot{v}_j \to y_j$, $j \neq i$, therefore each output is tracking its own reference, i.e., being controlled by its own reference only.

The New Controlled Plant Based on Primary Control for Constraint Control

Substitute the primary decoupling control law into the original controlled plant, yields the decoupled new controlled plant:

$$\tilde{x}(k+1) = A\tilde{x}(k) + B_d\tilde{d}(k) + BK_V\dot{v}(k) + (BK_F + I)F_k + BK_D\hat{d}(k)$$

$$\tilde{y}(k) = C\tilde{x}(k) = D_d\tilde{d}(k)$$

$$\tilde{y}_c(k) = C_c\tilde{x}(k) + D_{cd}\tilde{d}(k)$$

$$\tilde{u}(k) = K_V\dot{v}(k) + K_F F_k + K_D\hat{d}(k)$$

When the same control handle $\tilde{u}(k)$ is needed to enforce certain selected active constraint(s) while remaining the primary output tracking impacted least, the certain one(s) of primary output tracking will be traded off by switching to the selected most limiting control mode instead of allowing its reference to be altered via adding $\Delta y_r(k)$ to $y_r(k)$. For the new controlled plant, the control input is $\dot{v}$.

The Constraint Decoupling Control Based on the New Controlled Plant

The new controlled plant is:

$$\tilde{x}(k+1) = A\tilde{x}(k) + F_k^c + B_v\dot{v}(k) + B_d^c\hat{d}(k) + B_d\tilde{d}(k)$$

$$\tilde{y}_c(k) = C_c\tilde{x}(k) + D_{cd}\tilde{d}(k)$$

Current constraint output responses are, respectively, $$\begin{aligned}\tilde{y}_{ci}(k+1) &= C_{ci}A\tilde{x}(k) + C_{ci}B_v\dot{v}(k) + C_{ci}F_k^c + C_i\big(B_d^c\hat{d}(k) + B_d\tilde{d}(k)\big) + \\ &\quad D_{cdi}\tilde{d}(k+1) \\ &= C_{ci}F_k^c + (C_iB_d^c + D_{cdi})\hat{d}(k) \\ &= K_{cfp,i}^1 F_k^c + K_{cd,i}^1 \hat{d}(k) \\ &= K_{cf,i}^1 F_k + K_{cd,i}^1 \hat{d}(k),\end{aligned}$$

Since $F_k^c = (I + B_u K_F)F_k$,
$K_{cfp,i}^1(I + B_u K_F) = K_{cf,i}^1$.

$$\begin{aligned}\tilde{y}_{ci}(k+2) &= C_{ci}A^2\tilde{x}(k) + C_{ci}AB_v\dot{v}(k) + C_{ci}(A+I)F_k^c + \\ &\quad C_{ci}A\big(B_d^c\hat{d}(k) + B_d\tilde{d}(k)\big) + \ldots + \\ &\quad C_{ci}\big(B_d^c\hat{d}(k+1) + B_d\tilde{d}(k+1)\big) + \\ &\quad D_{cdi}\tilde{d}(k+2) \\ &= C_{ci}(A+I)F_k^c + (C_{ci}AB_d^c + C_{ci}B_d^c + C_{ci}B_d + 2D_{di})\hat{d}(k) \\ &= K_{cfp,i}^2 F_k^c + K_{cd,i}^2 \hat{d}(k) \\ &= K_{cf,i}^2 F_k^c + K_{cd,i}^2 \hat{d}(k)\end{aligned}$$

...

$$\begin{aligned}\tilde{y}_{ci}(k+3) &= C_{ci}A^3\tilde{x}(k) + C_{ci}A^2 B_v\dot{v}(k) + C_{ci}(A^2 + A + I)F_k^c + \ldots + \\ &\quad \begin{bmatrix} C_{ci}A^2\big(B_d^c\hat{d}(k) + B_d\tilde{d}(k)\big) + \\ C_iA\big(B_d^c\hat{d}(k+1) + B_d\tilde{d}(k+1)\big) + \\ C_i\big(B_d^c\hat{d}(k+2) + B_d\tilde{d}(k+2)\big) + D_{cdi}\tilde{d}(k+3) \end{bmatrix} \\ &= C_{ci}A^2 B_v\dot{v}(k) + C_{ci}(A^2 + A + I)F_k^c + \\ &\quad (C_{ci}A^2 B_d^c + C_{ci}A(B_d^c + B_d) + 2C_{ci}(B_d^c + B_d) + 3D_{cdi})\hat{d}(k) \\ &= E_{ci}\dot{v}(k) + K_{cfp,i}F_k^c + K_{cd,i}\hat{d}(k) \\ &= E_{ci}\dot{v}(k) + K_{cf,i}F_k + K_{cd,i}\hat{d}(k),\end{aligned}$$

Where $E_{ci} = C_{ci}A^{Rd_i-1}B_v$, $K_{cfp,i} = C_{ci}(A^{Rd_i-1} + \ldots + A + I)$,
$K_{cd,i} = C_{ci}A^{Rd_i-1}B_d^c + C_{ci}A^{Rd_i-2}(B_d^c + B_d) + \ldots + (Rd_i - 1)\cdot C_{ci}(B_d^c + B_d) + Rd_i\cdot D_{cdi}$.

$$\begin{bmatrix}\tilde{y}_{c1}(k+3) \\ \tilde{y}_{c2}(k+2) \\ \tilde{y}_{c3}(k+2) \\ \tilde{y}_{c4}(k+2)\end{bmatrix} = \begin{bmatrix} C_{c1}A^2 B_v \\ C_{c2}AB_v \\ C_{c3}AB_v \\ C_{c4}AB_v \end{bmatrix}\dot{v}(k) + \begin{bmatrix} C_{c1}(A^2 + A + I) \\ C_{c2}(A + I) \\ C_{c3}(A + I) \\ C_{c4}(A + I) \end{bmatrix}F_k^c +$$

$$\begin{bmatrix} C_{c1}(A^2 B_d^c + (A + 2I)(B_d^c + B_d)) + 3D_{cd1} \\ C_{c2}(AB_d^c + (B_d^c + B_d)) + 2D_{cd2} \\ C_{c3}(AB_d^c + (B_d^c + B_d)) + 2D_{cd3} \\ C_{c4}(AB_d^c + (B_d^c + B_d)) + 2D_{cd4} \end{bmatrix}\hat{d}(k)$$

$$= E_c\dot{v}(k) + K_{cfp}(I + B_u K_F)F_k + K_{cd}\hat{d}(k)$$
$$= E_c\dot{v}(k) + K_{cf}F_k + K_{cd}\hat{d}(k)$$

In general, the desired constraint response is to assure the tracking error and its derivatives (up to the constraint's relative degree) go to zero, let $\hat{y}_{ci}(k+j) = y_{rci}(k+j) - y_{ci}(k), i = 1, \ldots, 4; j = 0, 1, \ldots, Rd_{ci},$ $\hat{y}_{c1}(k+3) - \tilde{y}_{c1}(k+3) + k_{c1,2}(\hat{y}_{c1}(k+2) - \tilde{y}_{c1}(k+2)) + k_{c1,1}(\hat{y}_{c1}(k+1) - \tilde{y}_{c1}(k+1)) + k_{1,0}(\hat{y}_{c1}(k) - \tilde{y}_{c1}(k))$ $\hat{y}_{c2}(k+2) - \tilde{y}_{c2}(k+2)) + k_{c2,1}(\hat{y}_{c2}(k+1) - \tilde{y}_{c2}(k+1)) + k_{c2,0}(\hat{y}_{c2}(k) - \tilde{y}_{c2}(k)) = 0$ $\hat{y}_{c3}(k+2) - \tilde{y}_{c3}(k+2)) + k_{c3,1}(\hat{y}_{c3}(k+1) - \tilde{y}_{c3}(k+1)) + k_{c3,0}(\hat{y}_{c3}(k) - \tilde{y}_{c3}(k)) = 0$ $\hat{y}_{c4}(k+2) - \tilde{y}_{c4}(k+2)) + k_{c4,1}(\hat{y}_{c4}(k+1) - \tilde{y}_{c4}(k+1)) + k_{c4,0}(\hat{y}_{c4}(k) - \tilde{y}_{c4}(k)) = 0$ Properly choose the above coefficients $k_{ci,j}$, $i = 1, \ldots, 4$; $j = 0, \ldots, Rd_{ci}-1$ such that the eigenvalues of the following polynomial $\rho^{Rd_{ci}} + \ldots + k_{ci,j}\rho^j + \ldots + k_{ci,1}\rho + k_{ci,0} = 0$ are all within the unit circle, then the constraint output tracking dynamics is asymptotically stable.

The desired constraint output tracking response:

$$\begin{aligned}\tilde{y}_{c1}(k+3) &= \hat{y}_{c1}(k+3) + k_{c1,2}(\hat{y}_{c1}(k+2) - \tilde{y}_{c1}(k+2)) + \\ &\quad k_{c1,1}(\hat{y}_{c1}(k+1) - \tilde{y}_{c1}(k+1)) + k_{c1,0}(\hat{y}_{c1}(k) - \tilde{y}_{c1}(k)) \\ &= \begin{bmatrix} \hat{y}_{c1}(k+3) + k_{c1,2}\hat{y}_{c1}(k+2) + \\ k_{c1,1}\hat{y}_{c1}(k+1) + k_{c1,0}\hat{y}_{c1}(k) \end{bmatrix} - \\ &\quad [k_{c1,2}\tilde{y}_{c1}(k+2) + k_{c1,1}\tilde{y}_{c1}(k+1)] \\ &= [K_{ce1}\hat{y}_{c1}^*(k)] - \begin{bmatrix} k_{c1,2}\big(K_{cf,1}^2 F_k + K_{cd,1}^2 \hat{d}(k)\big) + \\ k_{c1,1}\big(K_{cf,1}^1 F_k + K_{cd,1}^1 \hat{d}(k)\big) \end{bmatrix} \\ &= K_{ce1}\hat{y}_1^*(k) - K_{cdf,1}F_k - K_{cdd,1}\hat{d}(k)\end{aligned}$$

$$\begin{aligned}\tilde{y}_{c2}(k+2) &= \hat{y}_{c2}(k+2) + k_{c2,1}(\hat{y}_{c2}(k+1) - \tilde{y}_{c2}(k+1)) + \\ &\quad k_{c2,0}(\hat{y}_{c2}(k) - \tilde{y}_{c2}(k)) \\ &= [\hat{y}_{c2}(k+2) + k_{c2,1}\hat{y}_{c2}(k+1) + k_{c2,0}\hat{y}_{c2}(k)] - \\ &\quad [k_{c2,1}\tilde{y}_{c2}(k+1)] \\ &= [K_{ce2}\hat{y}_{c2}^*(k)] - \big[k_{c2,1}\big(K_{cf,2}^1 F_k + K_{cd,2}^1 \hat{d}(k)\big)\big] \\ &= K_{ce2}\hat{y}_{c2}^*(k) - K_{cdf,2}F_k - K_{cdd,2}\hat{d}(k)\end{aligned}$$

$$\begin{aligned}\tilde{y}_{c3}(k+2) &= \hat{y}_{c3}(k+2) + k_{c3,1}(\hat{y}_{c3}(k+1) - \tilde{y}_{c3}(k+1)) + \\ &\quad k_{c3,0}(\hat{y}_{c3}(k) - \tilde{y}_{c3}(k)) \\ &= [\hat{y}_{c3}(k+2) + k_{c3,1}\hat{y}_{c3}(k+1) + k_{c3,0}\hat{y}_{c3}(k)] - \\ &\quad [k_{c3,1}\tilde{y}_{c3}(k+1)] \\ &= [K_{ce3}\hat{y}_{c3}^*(k)] - \big[k_{c3,1}\big(K_{cf,3}^1 F_k + K_{cd,3}^1 \hat{d}(k)\big)\big] \\ &= K_{ce3}\hat{y}_{c3}^*(k) - K_{cdf,3}F_k - K_{cdd,3}\hat{d}(k)\end{aligned}$$

$$\begin{aligned}\tilde{y}_{c4}(k+2) &= \hat{y}_{c4}(k+2) + k_{c4,1}(\hat{y}_{c4}(k+1) - \tilde{y}_{c4}(k+1)) + \\ &\quad k_{c4,0}(\hat{y}_{c4}(k) - \tilde{y}_{c4}(k)) \\ &= [\hat{y}_{c4}(k+2) + k_{c4,1}\hat{y}_{c4}(k+1) + k_{c4,0}\hat{y}_{c4}(k)] - \\ &\quad [k_{c4,1}\tilde{y}_{c4}(k+1)] \\ &= [K_{ce4}\hat{y}_{c4}^*(k)] - \big[k_{c4,1}\big(K_{cf,4}^1 F_k + K_{cd,4}^1 \hat{d}(k)\big)\big] \\ &= K_{ce4}\hat{y}_{c4}^*(k) - K_{cdf,4}F_k - K_{cdd,4}\hat{d}(k)\end{aligned}$$

Where consider constraint references as constant, $K_{ce1} = \lfloor 1 \quad k_{c1,2} \quad k_{c1,1} \quad k_{c1,0} \rfloor$, $$\hat{y}_{c1}^*(k) = \begin{bmatrix} y_{rc1}(k) - y_{c1}(k) \\ y_{rc1}(k) - y_{c1}(k) \\ y_{rc1}(k) - y_{c1}(k) \\ y_{rc1}(k) - y_{c1}(k) \end{bmatrix},$$

-continued $$K_{cdf,1} = (k_{c1,2}K_{cf,1}^2 + k_{c1,1}K_{cf,1}^1),$$

$$K_{cdd,1} = (k_{c1,2}K_{cd,1}^2 + k_{c1,1}K_{cd,1}^1);$$

$$K_{ce2} = \lfloor 1 \quad k_{c2,1} \quad k_{c2,0} \rfloor,$$

$$\hat{y}_{c2}^*(k) = \begin{bmatrix} y_{rc2}(k) - y_{c2}(k) \\ y_{rc2}(k) - y_{c2}(k) \\ y_{rc2}(k) - y_{c2}(k) \end{bmatrix},$$

$$K_{cdf,2} = k_{c2,1}K_{cf,2}^1,$$

$$K_{cdd,2} = k_{c2,1}K_{cd,2}^1;$$

$$K_{ce3} = \lfloor 1 \quad k_{c3,1} \quad k_{c3,0} \rfloor,$$

$$\hat{y}_{c3}^*(k) = \begin{bmatrix} y_{rc3}(k) - y_{c3}(k) \\ y_{rc3}(k) - y_{c3}(k) \\ y_{rc3}(k) - y_{c3}(k) \end{bmatrix},$$

$$K_{cdf,3} = k_{c3,1}K_{cf,3}^1,$$

$$K_{cdd,3} = k_{c3,1}K_{cd,3}^1;$$

$$K_{ce4} = \lfloor 1 \quad k_{c4,1} \quad k_{c4,0} \rfloor,$$

$$\hat{y}_{c4}^*(k) = \begin{bmatrix} y_{rc4}(k) - y_{c4}(k) \\ y_{rc4}(k) - y_{c4}(k) \\ y_{rc4}(k) - y_{c4}(k) \end{bmatrix},$$

$$K_{cdf,4} = k_{c4,1}K_{cf,4}^1,$$

$$K_{cdd,4} = k_{c4,1}K_{cd,4}^1.$$

Further the desired constraint output response in a compact way, $$\tilde{y}_c(k+Rd_c) = K_{cRE}\hat{y}_c^*(k) - K_{cdf}F_k - K_{cdd}\hat{d}(k)$$

Where $$K_{cRE} = \begin{bmatrix} K_{ce1} & 0 & 0 & 0 \\ 0 & K_{ce2} & 0 & 0 \\ 0 & 0 & K_{ce3} & 0 \\ 0 & 0 & 0 & K_{ce4} \end{bmatrix},$$

$$\hat{y}_c^*(k) = \begin{bmatrix} \hat{y}_{c1}^*(k) \\ \hat{y}_{c2}^*(k) \\ \hat{y}_{c3}^*(k) \\ \hat{y}_{c4}^*(k) \end{bmatrix},$$

$$K_{cdf} = \begin{bmatrix} K_{cdf,1} \\ K_{cdf,2} \\ K_{cdf,3} \\ K_{cdf,4} \end{bmatrix},$$

$$K_{cdd} = \begin{bmatrix} K_{cdd,1} \\ K_{cdd,2} \\ K_{cdd,3} \\ K_{cdd,4} \end{bmatrix}.$$

Compare the above desired constraint output response with the current constraint output response, yields, $$E_c\dot{v}(k) = K_{cRE}\hat{y}_c^*(k) - (K_{cdf}F_k + K_{cdd}\hat{d}(k)) - (K_{cf}F_k + K_{cd}\hat{d}(k))$$
$$= K_{cRE}\hat{y}_c^*(k) - (K_{cdf} + k_{cf})F_k - (K_{cdd} + K_{cd})\hat{d}(k)$$
$$= K_{cRE}\hat{y}_c^*(k) + K_{cF}F_k + K_{cD}\hat{d}(k)$$

$$\begin{bmatrix} e_{c11} & e_{c12} & e_{c13} \\ e_{c21} & e_{c22} & e_{c23} \\ e_{c31} & e_{c32} & e_{c33} \\ e_{c41} & e_{c42} & e_{c43} \end{bmatrix} \begin{bmatrix} \dot{v}_1(k) \\ \dot{v}_2(k) \\ \dot{v}_3(k) \end{bmatrix} = \begin{bmatrix} K_{ce1}\hat{y}_{c1}^* \\ K_{ce2}\hat{y}_{c2}^* \\ K_{ce3}\hat{y}_{c3}^* \\ K_{ce4}\hat{y}_{c4}^* \end{bmatrix} + \begin{bmatrix} K_{cF}(1,:)F_k \\ K_{cF}(2,:)F_k \\ K_{cF}(3,:)F_k \\ K_{cF}(4,:)F_k \end{bmatrix} +$$

$$\begin{bmatrix} K_{cD}(1,:)\hat{d}_k \\ K_{cD}(2,:)\hat{d}_k \\ K_{cD}(3,:)\hat{d}_k \\ K_{cD}(4,:)\hat{d}_k \end{bmatrix}$$

$$= \begin{bmatrix} M_{p,k}(1) \\ M_{p,k}(2) \\ M_{p,k}(3) \\ M_{p,k}(4) \end{bmatrix}$$

The decoupling matrix $E_c$ between $y_c$ and the pseudo input $\dot{v}$ is derived based on the constraint controlled plant shaped by the primary control, using generic form, $$E_c\dot{v}(k) = M_p \begin{bmatrix} e_{c11} & e_{c12} & e_{c13} \\ e_{c21} & e_{c22} & e_{c23} \\ e_{c31} & e_{c32} & e_{c33} \\ e_{c41} & e_{c42} & e_{c43} \end{bmatrix} \begin{bmatrix} \dot{v}_1 \\ \dot{v}_2 \\ \dot{v}_3 \end{bmatrix} = \begin{bmatrix} M_{p1} \\ M_{p2} \\ M_{p3} \\ M_{p4} \end{bmatrix}$$

Physics Based Constraint Subset Classification

Based on plant (for example, engine) dynamics knowledge learned from cycle partial studies and tests, assume that there are two subsets for the concerned constraints based on effective control modes, corresponding to the two primary control outputs to be traded off, respectively:

$y_1$-subset: $\{y_{c1}, y_{c2}\}$ $y_2$-subset: $\{y_{c3}, y_{c4}\}$

Based on the above defined problem, the constraint control decoupling constraints from the non-traded off controlled output $y_3$ is:

$$\begin{bmatrix} e_{c11} & e_{c12} \\ e_{c21} & e_{c22} \\ e_{c31} & e_{c32} \\ e_{c41} & e_{c42} \end{bmatrix} \begin{bmatrix} \dot{v}_1 \\ \dot{v}_2 \end{bmatrix} = M_p - E_c(:,3) \cdot \dot{v}_3$$

$$= \begin{bmatrix} M_{p1} \\ M_{p2} \\ M_{p3} \\ M_{p4} \end{bmatrix} - \begin{bmatrix} e_{c13} \\ e_{c23} \\ e_{c33} \\ e_{c43} \end{bmatrix} \dot{v}_3$$

$$= \begin{bmatrix} M_p^{d3}(1) \\ M_p^{d3}(2) \\ M_p^{d3}(3) \\ M_p^{d3}(4) \end{bmatrix}$$

$$= M_p^{d3}$$

Constraint Controller Set Determined by Constraint Subset

The physics-based classification of the above constraints determines not only the constraint controller subsets but also the primary control traded-off target for each subset. The details are: (a) The constraints classification should be physics-based, that is, for a given primary control output, the projection of each constraint in its associated constraint subset along the primary control output dimension (or direction) should be the dominant part of the constraint. In layman words, with respect to a given primary control reference, the (b) The total number of constraint subsets is less than or equal to the primary control handles; (c) The constraints in each subset are only to be mapped to one specified primary control trade-off target.

Decoupled SISO Constraint Controllers

Without loss of generality and clear formulation, assume that the concerned constraints are active either in single subset only or in two subsets at same time, and they are classified as:

$y_1$-subset:$\{y_{c1},y_{c2}\}$, $y_2$-subset:$\{y_{c3},y_{c4}\}$.

All possible cases may be the following:

$\{y_{c1}\},\{y_{c2}\},\{y_{c3}\},\{y_{c4}\},\{y_{c1},y_{c3}\},\{y_{c1},y_{c4}\},\{y_{c2},y_{c3}\}$, $\{y_{c2},y_{c4}\}$

It follows that at same time, the following constraint controllers need to be run in parallel.

Constraint controllers for two subset cases are derived below:

$$\begin{bmatrix} e_{c11} & e_{c12} \\ e_{c31} & e_{c32} \end{bmatrix} \begin{bmatrix} \dot{v}_1 \\ \dot{v}_2 \end{bmatrix} = \begin{bmatrix} M_p^{d3}(1) \\ M_p^{d3}(3) \end{bmatrix}$$

$$\begin{bmatrix} e_{c11} & e_{c12} \\ e_{c41} & e_{c42} \end{bmatrix} \begin{bmatrix} \dot{v}_1 \\ \dot{v}_2 \end{bmatrix} = \begin{bmatrix} M_p^{d3}(1) \\ M_p^{d3}(4) \end{bmatrix}$$

$$\begin{bmatrix} e_{c21} & e_{c22} \\ e_{c31} & e_{c32} \end{bmatrix} \begin{bmatrix} \dot{v}_1 \\ \dot{v}_2 \end{bmatrix} = \begin{bmatrix} M_p^{d3}(2) \\ M_p^{d3}(3) \end{bmatrix}$$

$$\begin{bmatrix} e_{c21} & e_{c22} \\ e_{c41} & e_{c42} \end{bmatrix} \begin{bmatrix} \dot{v}_1 \\ \dot{v}_2 \end{bmatrix} = \begin{bmatrix} M_p^{d3}(2) \\ M_p^{d3}(4) \end{bmatrix}$$

Define $$(E_c^{1,3})^{-1} = \begin{bmatrix} e_{c11} & e_{c12} \\ e_{c31} & e_{c32} \end{bmatrix}^{-1} = \begin{bmatrix} ie_{c11}^{1,3} & ie_{c12}^{1,3} \\ ie_{c21}^{1,3} & ie_{c22}^{1,3} \end{bmatrix} = iE_c^{1,3},$$

$$(E_c^{1,4})^{-1} = \begin{bmatrix} e_{c11} & e_{c12} \\ e_{c41} & e_{c42} \end{bmatrix}^{-1} = \begin{bmatrix} ie_{c11}^{1,4} & ie_{c12}^{1,4} \\ ie_{c21}^{1,4} & ie_{c22}^{1,4} \end{bmatrix} = iE_c^{1,4},$$

$$(E_c^{2,3})^{-1} = \begin{bmatrix} e_{c21} & e_{c22} \\ e_{c31} & e_{c32} \end{bmatrix}^{-1} = \begin{bmatrix} ie_{c11}^{2,3} & ie_{c12}^{2,3} \\ ie_{c21}^{2,3} & ie_{c22}^{2,3} \end{bmatrix} = iE_c^{2,3},$$

$$(E_c^{2,4})^{-1} = \begin{bmatrix} e_{c21} & e_{c22} \\ e_{c41} & e_{c42} \end{bmatrix}^{-1} = \begin{bmatrix} ie_{c11}^{2,4} & ie_{c12}^{2,4} \\ ie_{c21}^{2,4} & ie_{c22}^{2,4} \end{bmatrix} = iE_c^{2,4},$$

Then the constraint controllers that further decouples constraints from one another for two subset cases are:

$\dot{v}_1^{i,j} = ie_{c11}^{i,j} \cdot M_p^{d3}(i) + ie_{c12}^{i,j} \cdot M_p^{d3}(j),$ $\dot{v}_2^{i,j} = ie_{c21}^{i,j} \cdot M_p^{d3}(i) + ie_{c22}^{i,j} \cdot M_p^{d3}(j).$ Where i=1, 2; j=3, 4.

Constraint controllers for single subset cases are derived below:

$$\begin{bmatrix} e_{c11} \\ e_{c21} \end{bmatrix} \dot{v}_1 = M_p^{d3}(1:2) - E_c(1:2, 2) \cdot \dot{v}_2$$

$$= \begin{bmatrix} M_p^{d3}(1) \\ M_p^{d3}(2) \end{bmatrix} - \begin{bmatrix} e_{c12} \cdot \dot{v}_2 \\ e_{c22} \cdot \dot{v}_2 \end{bmatrix}$$

$$= M_{p,d_2}^{d3},$$

$$\begin{bmatrix} e_{c32} \\ e_{c42} \end{bmatrix} \dot{v}_2 = M_p^{d3}(3:4) - E_c(3:4, 1) \cdot \dot{v}_1$$

$$= \begin{bmatrix} M_p^{d3}(3) \\ M_p^{d3}(4) \end{bmatrix} - \begin{bmatrix} e_{c31} \cdot \dot{v}_1 \\ e_{c41} \cdot \dot{v}_1 \end{bmatrix}$$

$$= M_{p,d_1}^{d3},$$

Then the constraint controllers for single subset cases:

$\dot{v}_1^i = (e_{ci,1})^{-1} \cdot M_{p,d_2}^{d3}(i),$ $\dot{v}_2^j = (e_{cj,2})^{-1} \cdot M_{p,d_2}^{d3}(i).$ where i=1, 2; j=3, 4.

The MIMO constraint control design method demonstrated for two constraint subsets above is generic, and it can be easily applied to the cases where constraint subsets are more than two.

Constraint Control Selection Logic

For the problem of multiple variable control with multiple constraints, in general, the multiple constraints can be distributed in two or higher dimensions, i.e., there are two or more subsets of constraints. Further, the to-be-active constraints may be sometimes in one subset only and sometimes in two or more subsets at same time.

Therefore, it is desired that the Selection Logic should process all subsets at each step and the transitions of multi-subsets and single subset. Specifically, in each subset, the Selection Logic selects the multi-subset most limiting constraint from the pseudo inputs resulted from two or more subsets active cases and the single subset most limiting constraint from the pseudo inputs resulted from single subset active case. Then the Selection Logic selects the most limiting constraint from the multi-subset most limiting constraint, the single subset most limiting constraint, and the pseudo input generated by the traded-off controlled output based on pre-determined selection logic, which is determined by the physical relationships between the max/min constraints and the traded-off controlled output. Then in system level, i.e., considering the results from all subsets, the Selection Logic conducts integrated selection to make final decisions which pseudo inputs should be placed to the pseudo input entries.

Considering for a given constraint, single subset case and multi-subsets case cannot happen to it at same time, however it can transition from one to the other, therefore, in a given subset, the single subset case and multi-subsets case need to go through separate selection processes, and the transition will naturally go through by the selection results from system level integrated selection.

An example for demonstration of the selection logic is provided below. The example is associated with $y_1$ and $y_2$ respectively, and each subset has 2 constraints: $y_1$-subset: {max $y_{c1}$, min $y_{c1}$, min $y_{c2}$}, $y_2$-subset: {max $y_{c3}$, min $y_{c3}$, max $y_{c4}$}.

Assume that there are two subsets of the concerned constraints, corresponding to two primary control outputs to be traded off, respectively:

$$y_1\text{-subset}:\{y_{c1},y_{c2}\}$$

$$y_2\text{-subset}:\{y_{c3},y_{c4}\}\text{ i.e., }\{\max y_{c3},\min y_{c3},\max y_{c4}\}$$

and consider {max $y_{c1}$, min $y_{c1}$, min $y_{c2}$} and {max $y_{c3}$, min $y_{c3}$, max $y_{c4}$} case.

Without loss of generality and clear formulation, assume that the concerned constraints are active either in single subset only or in two subsets at same time, all possible cases are given below:

$$\{y_{c1}\},\{y_{c2}\},\{y_{c3}\},\{y_{c4}\},\{y_{c1},y_{c3}\},\{y_{c1},y_{c4}\},\{y_{c2},y_{c3}\},\{y_{c2},y_{c4}\},$$

Considering the constraints {max $y_{c1}$, min $y_{c1}$, min $y_{c2}$} in $y_1$-subset, assume that to satisfy max $y_{c1}$ needs to reduce $y_1$, i.e., $\dot{v}_1^{y_1}<0$, if max $y_{c1}$ is violated, it generates $\dot{v}_1^{1+,\cdot}<0$ or, $\dot{v}_1^{1+}<0$, therefore, select the minimum value from $\dot{v}_1^{1+,\cdot}$, $\dot{v}_1^{1+}$, and $\dot{v}_1^{y_1}$ can satisfy max $y_{c1}$; to satisfy min $y_{c1}$ needs to increase $y_1$, i.e., $\dot{v}_1^{y_1}>0$, if min $y_{c1}$ is violated, it generates $\dot{v}_1^{1-,\cdot}>0$ or, $\dot{v}_1^{1-}>0$; to satisfy min $y_{c2}$ needs to increase $y_1$, i.e., $\dot{v}_1^{y_1}>0$, if min $y_{c2}$ is violated, it generates $\dot{v}_1^{2-,\cdot}>0$ or, $\dot{v}_1^{2-}>0$; therefore, select the maximum value from $\dot{v}_1^{1-,\cdot}$, $\dot{v}_1^{2-,\cdot}$, $\dot{v}_1^{1-}$, $\dot{v}_1^{2-}$ and $\dot{v}_1^{y_1}$ can satisfy both min $y_{c1}$ and min $y_{c2}$. Also assume that maximum constraint overrules the minimum constraints.

Figure 4:
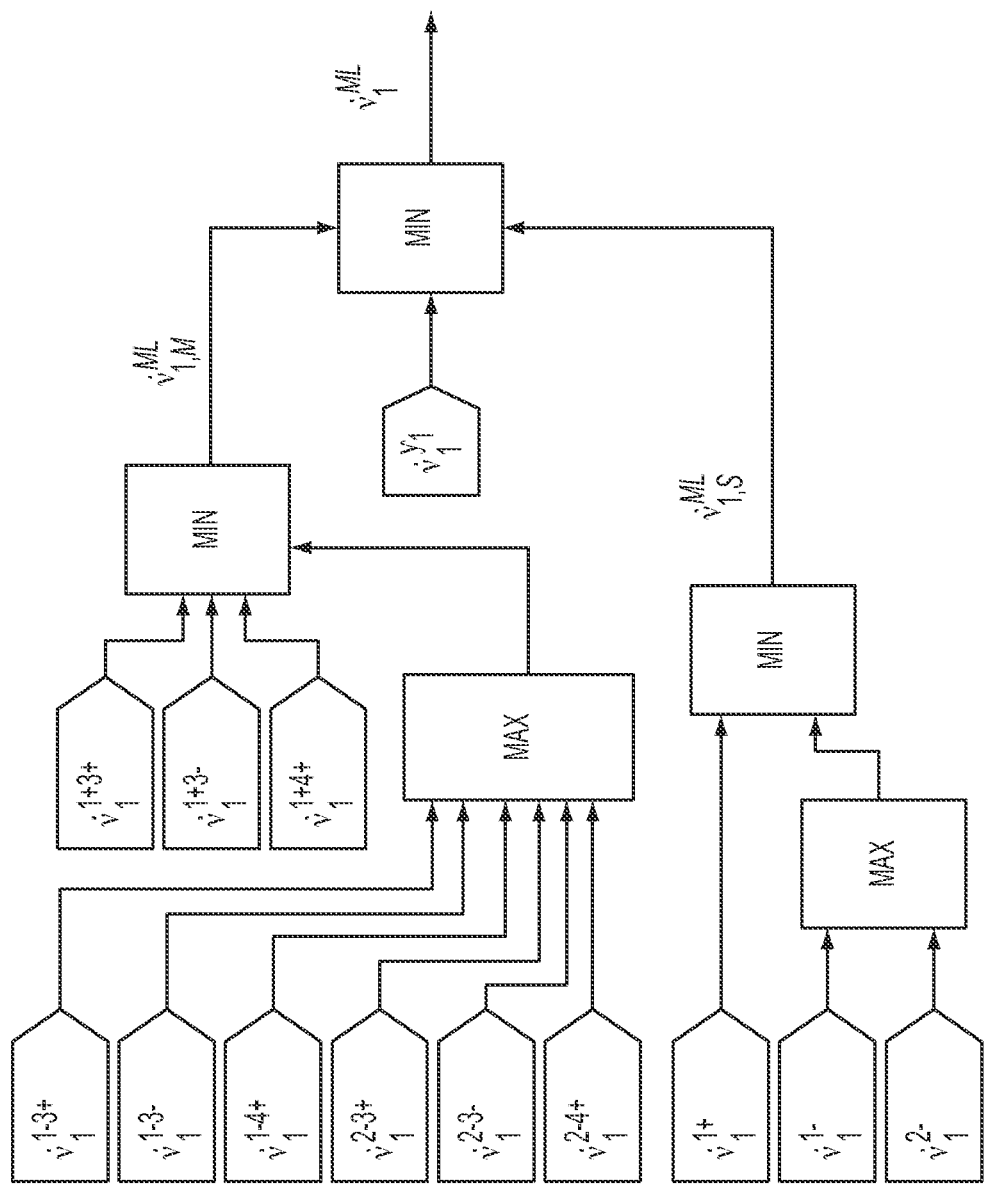
FIG. 4 is a diagram representation of selection logic for a one dimension constraint set following a min/max selection principle.

FIG. 4 demonstrates the assumed $y_1$-subset selection logic for {max $y_{c1}$, min $y_{c1}$, min $y_{c2}$}. In single subset case, min $y_{c1}$ and min $y_{c2}$ generate $\dot{v}_1^{1-}$ and $\dot{v}_1^{2-}$, respectively; max $y_{c1}$ generates $\dot{v}_1^{1+}$. Applying the assumed relationships for $y_1$-subset aforementioned, the single subset most limiting constraint is $\dot{v}_{1,S}^{ML}=\min(\max(\dot{v}_1^{1-},\dot{v}_1^{2-}),\dot{v}_1^{1+})$. In multi-subsets case, min $y_{c1}$ generates $\dot{v}_1^{1-3+}$, $\dot{v}_1^{1-3-}$ and $\dot{v}_1^{1-4+}$, min $y_{c2}$ generates $\dot{v}_1^{2-3+}$, $\dot{v}_1^{2-3-}$ and $\dot{v}_1^{2-4+}$, max $y_{c1}$ generates $\dot{v}_1^{1+3+}$, $\dot{v}_1^{1+3-}$, and $\dot{v}_1^{1+4+}$. Applying the assumed relationships aforementioned, the multi-subsets most limiting constraint of is $\dot{v}_{1,M}^{ML}=\min(\max(\dot{v}_1^{1-3+},\dot{v}_1^{1-3-},\dot{v}_1^{1-4+},\dot{v}_1^{2-3+},\dot{v}_1^{2-3-},\dot{v}_1^{2-4+}),\dot{v}_1^{1+3+},\dot{v}_1^{1+3-},\dot{v}_1^{1+4+})$; the $y_1$-subset most limiting constraint is: $\dot{v}_1^{ML}=\min(\dot{v}_1^{y_1},\dot{v}_{1,S}^{ML},\dot{v}_{1,M}^{ML})$.

Considering the constraints {max $y_{c3}$, min $y_{c3}$, max $y_{c24}$} in $y_2$-subset assume that to satisfy max $y_{c3}$ needs to increase $y_2$, i.e., $\dot{v}_2^{y_2}\le 0$, if max $y_{c3}$ is violated, it generates $\hat{v}_2^{\cdot,3+}>0$ or, $\dot{v}_2^{3+}>0$; to satisfy max $y_{c4}$ needs to increase $y_2$, i.e., $\dot{v}_2^{y_2}>0$, if max $y_{c4}$ is violated, it generates $\dot{v}_2^{\cdot,4+}>0$ or, $\dot{v}_2^{4+}>0$; therefore, select the maximum value from $\dot{v}_2^{\cdot,3+}$, $\dot{v}_2^{\cdot,4+}$, $\dot{v}_2^{3+}$, $\dot{v}_2^{4+}$ and $\dot{v}_2^{y_2}$ can satisfy both max $y_{c3}$ and max $y_{c4}$; to satisfy min $y_{c3}$ needs to reduce $y_2$, i.e., $\dot{v}_2^{y_2}<0$, if min $y_{c3}$ is violated, it generates $\dot{v}_2^{\cdot,3-}<0$ or, $\dot{v}_2^{3-}<0$, therefore, select the minimum value from $\dot{v}_2^{\cdot,3-}$, $\dot{v}_2^{3-}$, and $\dot{v}_2^{y_2}$ can satisfy min $y_{c3}$. Also assume that maximums overrule the minimum constraint.

Figure 5:
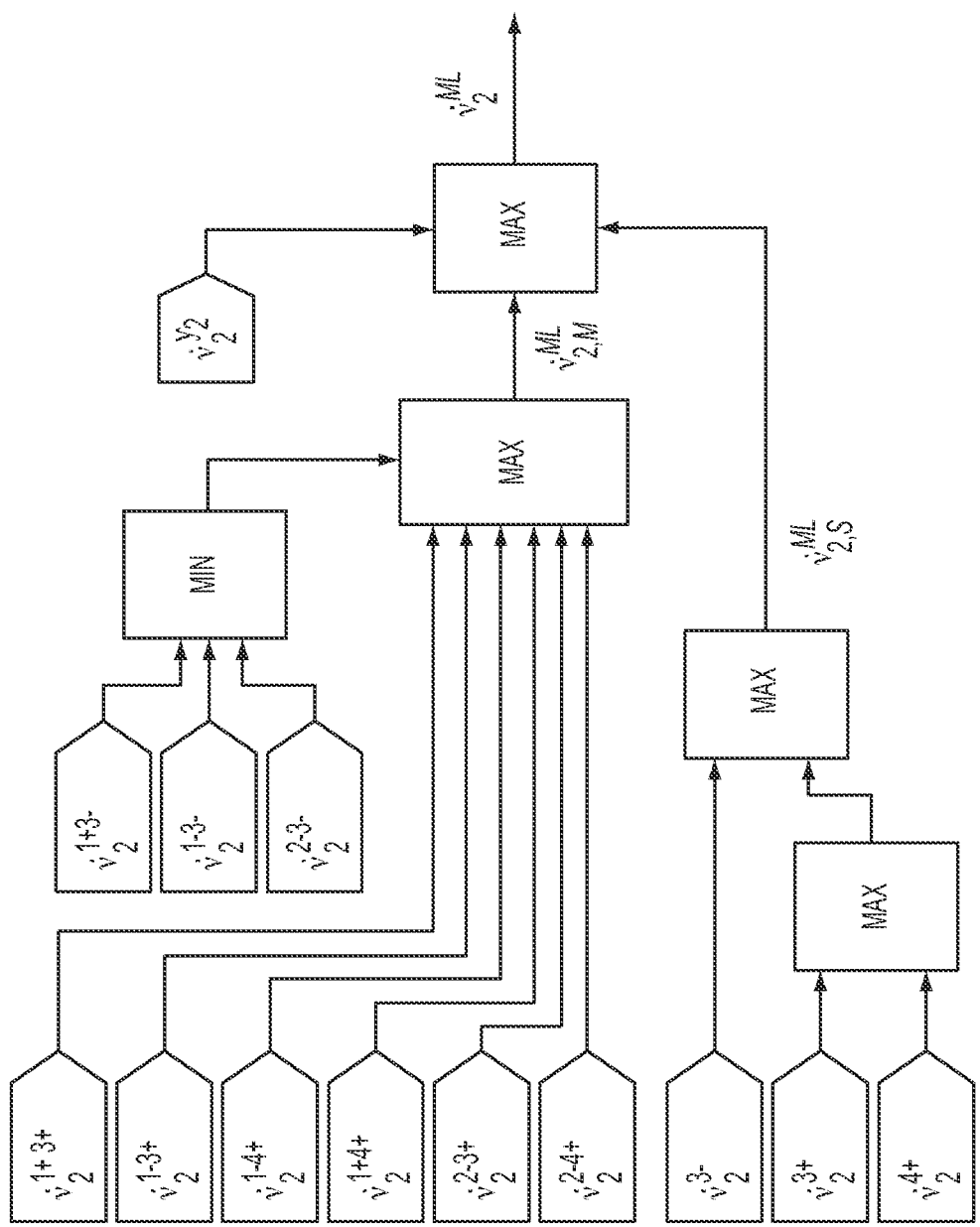
FIG. 5 is a diagram representation of selection logic for a one dimension constraint set following a different min/max selection principle.

FIG. 5 demonstrates the assumed $y_2$-subset selection logic for {max $y_{c3}$, min $y_{c3}$, max $y_{c24}$}. In single subset case, max $y_{c3}$ and max $y_{c4}$ generate $\dot{v}_2^{3+}$ and $\dot{v}_2^{4+}$, respectively; min $y_{c3}$ generates $\dot{v}_2^{3-}$. Applying the assumed relationships for $y_2$-subset aforementioned, the single subset most limiting constraint is $\dot{v}_{2,S}^{ML}=\max(\max(\dot{v}_2^{3+},\dot{v}_2^{4+}),\dot{v}_2^{3-})$. In multi-subsets case, max $y_{c3}$ generates $\dot{v}_2^{1-3+}$, $\dot{v}_2^{1+3+}$ and $\dot{v}_2^{2-3+}$, max $y_{c4}$ generates $\dot{v}_2^{1-4+}$, $\dot{v}_2^{1+4+}$ and $\dot{v}_2^{2-4+}$, min $y_{c3}$ generates $\dot{v}_2^{1+3-}$, $\dot{v}_2^{1-3-}$, and $\dot{v}_2^{2-3-}$. Applying the assumed relationships aforementioned, the multi-subsets most limiting constraint is $\dot{v}_{2,S}^{ML}=\max(\min(\dot{v}_2^{1+3-},\dot{v}_2^{1-3-},\hat{v}_2^{2-3-}),\dot{v}_2^{1+3+},\dot{v}_2^{1-3+},\dot{v}_2^{1-4+},\dot{v}_2^{1+4+},\dot{v}_2^{2-3+},\dot{v}_2^{2-4+})$; the $y_2$-subset most limiting constraint is: $\dot{v}_2^{ML}=\max(\dot{v}_2^{y_2},\dot{v}_{2,S}^{ML},\dot{v}_{2,M}^{ML})$.

In system level, considering both subsets $y_1$-subset and $y_2$-subset are active at one time, one of them is active at another time, and the transitions, the integrated selection makes decisions based on the results from the two subsets: $\dot{v}_1^{ML}$, $\dot{v}_1^{y_1}$, $\dot{v}_{1,S}^{ML}$, $\dot{v}_{1,M}^{ML}$, $\dot{v}_2^{ML}$, $\dot{v}_2^{y_2}$, $\dot{v}_{2,S}^{ML}$, $\dot{v}_{2,M}^{ML}$, and desires to make smooth transitions.

FIG. 6 demonstrates the integrated selection logic. The checking conditions are determined by the results from the two subsets: $\dot{v}_1^{ML}$, $\dot{v}_1^{y_1}$, $\dot{v}_{1,S}^{ML}$, $\dot{v}_{1,M}^{ML}$, $\dot{v}_2^{ML}$, $\dot{v}_2^{y_2}$, $\dot{v}_{2,S}^{ML}$, $\dot{v}_{2,M}^{ML}$.

Step 1: If both subsets are active, i.e., the first condition is true, then both $y_1$ and $y_2$ need to be traded off, it follows that $\dot{v}_1^{y_1}$ is replaced by $\dot{v}_{1,M}^{ML}$, and $\dot{v}_2^{y_2}$ replaced by $\dot{v}_{2,M}^{ML}$.

Step 2: If not both subsets are active, check condition 2—if $y_1$ subset is active only. If condition 2 is true, then this is single subset case, $y_1$ needs to be traded off, and $y_2$ need to stay, it follows that $\dot{v}_1^{y_1}$ is replaced by $\dot{v}_{1,S}^{ML}$, and $\dot{v}_2^{y_2}$ is kept.

Step 3: If condition 2 is not true, check condition 3—if $y_2$ subset is active only. If condition 3 is true, then this is single subset case, $y_2$ needs to be traded off, and $y_1$ need to stay, it follows that $\dot{v}_2^{y_2}$ is replaced by $\dot{v}_{2,S}^{ML}$, and $\dot{v}_1^{y_1}$ is kept.

Step 4: If condition 3 is not true, then there are no active constraints in both subsets, it follows that $\dot{v}_1^{y_1}$ and $\dot{v}_2^{y_2}$ stay, no primary controlled outputs are traded off.

More specifically, referring to FIG. 6, the algorithm starts at step 20 and proceeds to step 22. At step 22, if $\dot{v}_1^{y_1}\neq\dot{v}_1^{ML}$ && $\dot{v}_2^{y_2}\neq\dot{v}_2^{ML}$ Then, at step 24, $$\dot{v}_1=\dot{v}_1^{ML};$$

$$\dot{v}_2=\dot{v}_2^{ML};$$

then proceed to end at step 26.

Otherwise the algorithm proceeds to step 28. At step 28, if $\dot{v}_1^{y_1}=\dot{v}_1^{ML}$ && $\dot{v}_2^{y_2}\neq\dot{v}_2^{ML}$ Then, at step 30, $$\dot{v}_1=\dot{v}_1^{y_1}$$

$$\dot{v}_2=\dot{v}_{2,S}^{ML};$$

then proceed to end at step 26.

Otherwise the algorithm proceeds to step 32. At step 32, if $\dot{v}_1^{y_1}\neq\dot{v}_1^{ML}$ && $\dot{v}_2^{y_2}=\dot{v}_2^{ML}$ Then, at step 34, $$\dot{v}_1=\dot{v}_{1,S}^{ML};$$

$$\dot{v}_2=\dot{v}_2^{y_2};$$

then proceed to end at step 26.

Otherwise, the algorithm proceeds to step 36, where, $$\dot{v}_1=\dot{v}_1^{y_1};$$

$$\dot{v}_2=\dot{v}_2^{y_2};$$

End at step 26.

Figure 1:
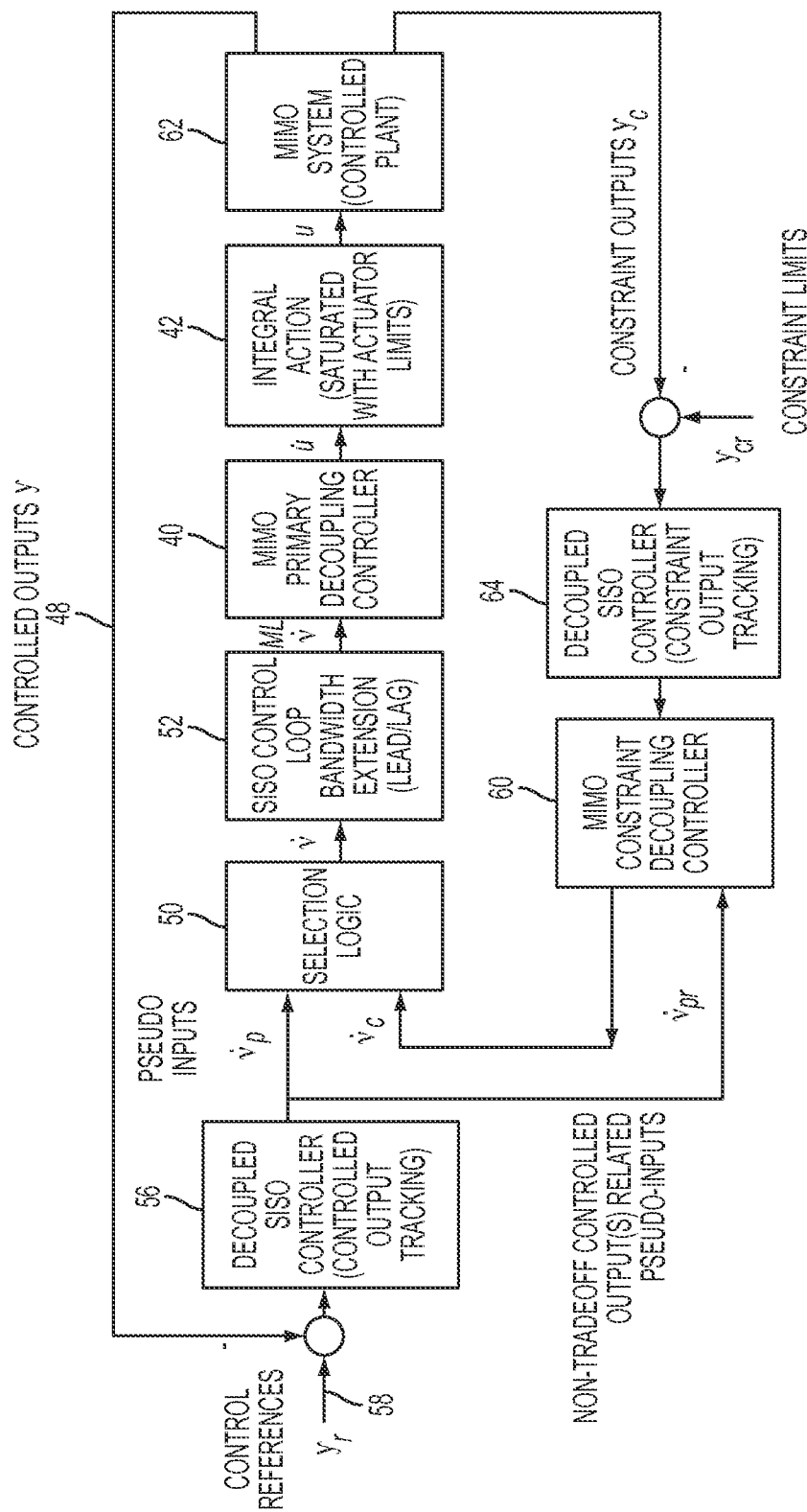
FIG. 1 is a block diagram representation of a control system architecture which can be multiple variable control with high dimension multiple constraints or single variable control with single dimension multiple constraints embodiment according to the current disclosure.

The architecture of a generic Advanced Multiple Variable Control with High Dimension Multiple Constraints is shown in FIG. 1. It works in the way described below:

(1) A multiple input multiple output (MIMO) primary decoupling controller 40: (a) generates control command derivatives—u̇ to the integral action 42; and (b) provides decoupled control (using dynamics inversion or some other known method) from v̇ to y. The dynamics of the decoupled controlled plant (from v̇ to y) are shaped to enable desired robust control of the primary control outputs. The coupled I/O mapping between u̇ and y becomes decoupled new I/O mapping between v̇ and y, and the pseudo input entries v̇ provide the common comparable points that the pseudo inputs generated by constraint controllers can be compared with the pseudo inputs generated by primary controlled outputs in accordance with the Selection Logic 50.

(2) A set of SISO lead/lag controllers 52 may be installed upstream of the primary MIMO Primary Decoupling Controller 40 to extend the bandwidths of decoupled primary SISO control loops, providing v̇* to the primary MIMO Primary Decoupling Controller 40. Because this is a common element that would affect the primary and the constraint control, this would also extend the SISO closed loop bandwidth when running to constraints.

(3) A set of decoupled SISO controllers 56 for controlled outputs tracking which receive primary controlled output tracking errors (Control References (58) minus the Controlled Outputs (48)) and provide desired primary controlled output based pseudo inputs $\dot{v}_p$, respectively. Tunes the primary control loops independently of the constraint outputs, so they can be optimized without impacting the characteristics of the constraint control.

(4) A multiple input multiple output (MIMO) constraint decoupling controller 60 that controls the New Controlled Plant formed by the MIMO primary controller 40 and the physical plant 62. The MIMO constraint decoupling controller 60: (a) generates pseudo inputs $\dot{v}_c$ based on the desired constraint responses for the Selection Logic; and (b) decouples the constraints from one another based on the newly shaped controlled plant v̇ to $y_c$; and (c) decouples the constraints from the non-traded off primary controlled outputs by rejecting the non-traded off primary controlled outputs as known disturbance inputs $\dot{v}_{pr}$.

(5) A set of decoupled SISO controllers 64 for constraint outputs tracking which receive constraint output tracking errors (Constraint Limits minus Constraint Outputs) and provide desired constrain controlled pseudo inputs $\dot{v}_c$, respectively. Tunes the constraint control loops independently of the primary outputs, so they can be optimized without impacting the characteristics of the primary control.

(6) Selection Logic 50 compares the pseudo inputs generated by every given subset of constraints and the pseudo input generated by the primary controlled output associated with that subset, selects the most limiting constraint for each subset, and makes system level selection integration to determine the final pseudo inputs to go into the SISO Lead/Lag and MIMO Primary Decoupling Controller.

Figure 3:
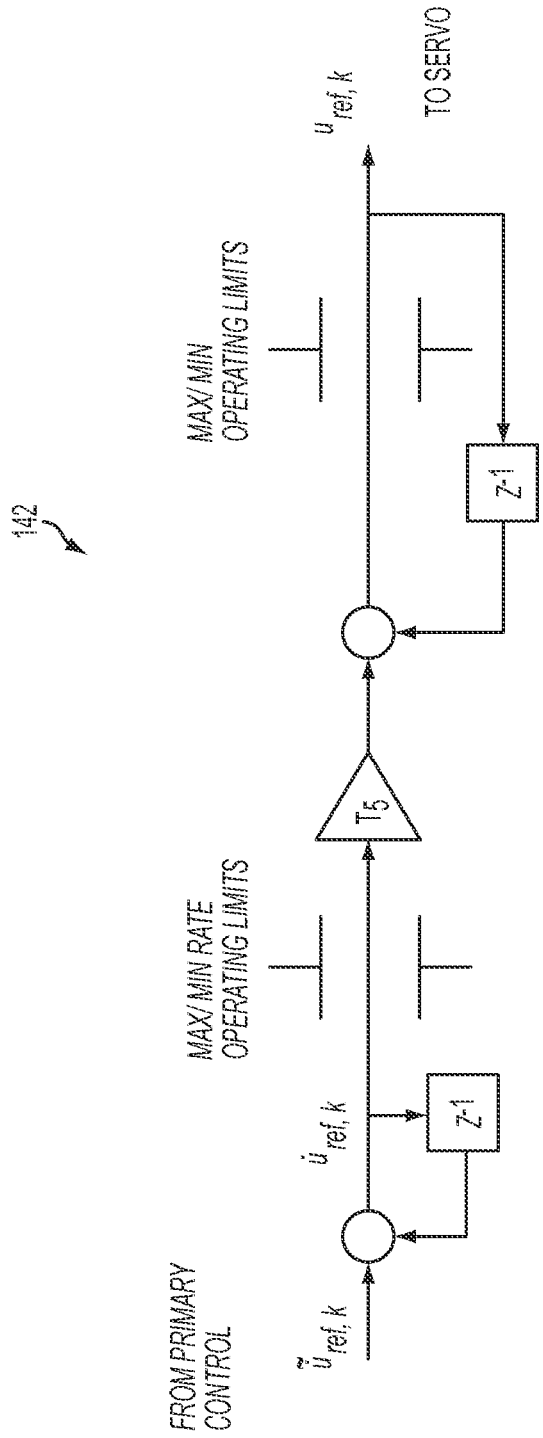
FIG. 3 is a block diagram representation of an exemplary common single-input-single-output (SISO) integrator for use with the current embodiments.

(7) An integral action 42 includes a set of integrators common to both the primary and constraint control. The integral action integrates each u̇ into a corresponding u thus forming the reference for each actuator inner loop. Each integrator may be dynamically limited to respect corresponding actuator operating limits. The integrator is shown in FIG. 3.

Figure 2:
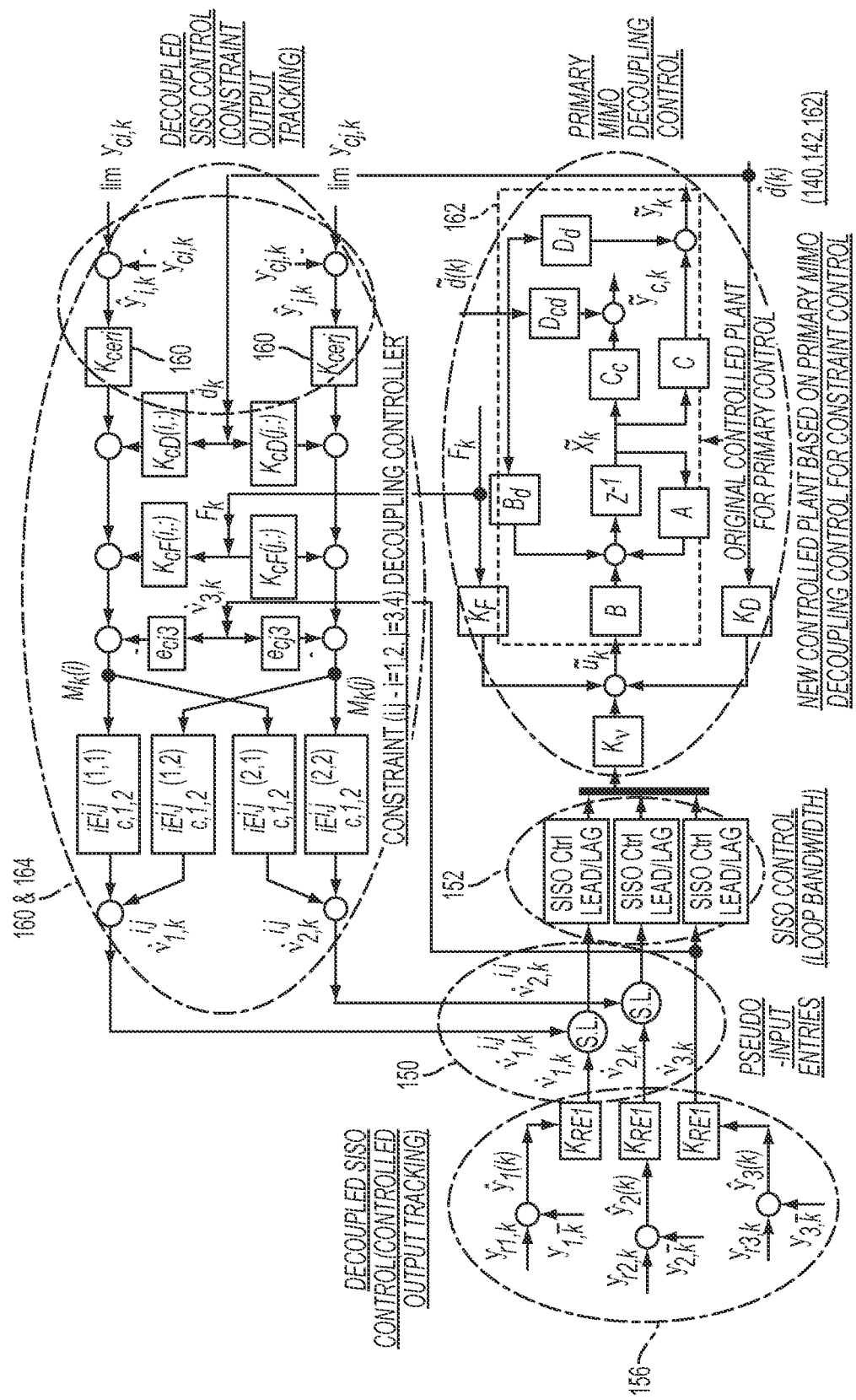
FIG. 2 is a block diagram representation of an exemplary implementation of the exemplary control system architecture according to the current disclosure.

As an example implementation, architecture of a 3×3 Advanced Multiple Variable Control with Two sets of Constraints is shown in FIG. 2 (the elements in FIG. 2 directly or indirectly corresponding to elements in FIG. 1 have the same numerals, but have added one-hundred). It works in the way described below:

(1) 3×3 MIMO primary decoupling controller 140 not only generating control command derivatives—$\dot{u}_1$, $\dot{u}_2$ and $\dot{u}_3$ to the integral action but also shaping the common pseudo input entries—$\dot{v}_1$, $\dot{v}_2$, and $\dot{v}_3$ based on primary controlled output y ($y_1$, $y_2$, $y_3$) to u̇ ($\dot{u}_1$, $\dot{u}_2$, $\dot{u}_3$) dynamics inversion and decoupled primary SISO desired plant dynamics via state feedback such that the coupled I/O mapping between u̇ and Y becomes decoupled new I/O mapping between v̇ and Y with desired plant dynamics, and the pseudo input entries v̇ provide the common comparable points that the pseudo inputs generated by constraint control can be compared with the pseudo inputs generated by primary control accordingly in Selection Logic.

(2) There are only three control handles in this example, which implies there will be at most three subsets of constraints. In this case, assume two subsets of constraints associated with $y_1$ and $y_2$ respectively, and each subset has two constraints: $y_1$-subset: {max $y_{c1}$, min $y_{c1}$, min $y_{c2}$}, $y_2$-subset: {max $y_{c3}$, min $y_{c3}$, max $y_{c4}$}.

(3) Three SISO lead/lag controllers 152 that is intend to extend the bandwidths of decoupled primary SISO control loops, respectively, also are common to be used by the selected constraints for the same purpose. If the SISO lead/lags are not needed, then they can be set to 1, respectively.

(4) Three decoupled SISO proportional controllers 156 for controlled outputs tracking which receive primary controlled output tracking errors (Control References minus Controlled Outputs) and provide desired primary controlled outputs based pseudo inputs—$\dot{v}_1$, $\dot{v}_2$, and $\dot{v}_3$, respectively. Assumed $y_3$ is not to be traded off, $\dot{v}_3$ will serve as known disturbance input in constraint control; $\dot{v}_1$ and $\dot{v}_2$ will go into Selection Logic 150 to be compared with the pseudo inputs generated by constraint controllers.

(5) A set of 2×2 MIMO constraint decoupling controllers 160 is shown (2×2 is assumed case in this example, any number of such constraint decoupling controllers can be utilized, depending upon the actual control system) to control two subsets of constraints. The constraint decoupling controllers in this example decouple the constraint of subset 1 from constraint of subset 2, respectively, i.e., decoupling $y_{c1}$ from $y_{c3}$, $y_{c1}$ from $y_{c4}$, $y_{c2}$ from $y_{c3}$, $y_{c2}$ from $y_{c4}$, based on constraints $y_c$ to v̇ dynamics inversion and decoupled constraint SISO desired dynamics via state feedback, and decoupling the constraints from the non-traded off primary controlled output $y_3$ by rejecting the known disturbance inputs $\dot{v}_3$, it follows that the resulted four decoupled SISO constraint controllers (($y_{ci} \rightarrow \dot{v}_1^{i,j}$), i=1, 2; j=3, 4) for generating pseudo inputs $\dot{v}_1^{i,j}$ for subset 1 to be compared with $\dot{v}_1$ and four decoupled SISO constraint controllers (($y_{cj} \rightarrow \dot{v}_2^{i,j}$), i=1, 2; j=3, 4) for generating pseudo inputs $\dot{v}_2^{i,j}$ for subset 2 to be compared with $\dot{v}_2$. If a constraint has two limits, then the same decoupled SISO constraint controller generates two outputs, that is, two pseudo inputs each corresponds to one limit input; if the constraint has one limit, then the decoupled SISO constraint controller generates one output, that is, one pseudo input. Based on assumptions on constraints in this case, there are following generated pseudo inputs, $\dot{v}_1^{1+,3-}$, $\dot{v}_1^{1+,3+}$, $\dot{v}_1^{1-,3+}$, $\dot{v}_1^{1-,3-}$, $\dot{v}_1^{1+,4+}$, $\dot{v}_1^{1-,4+}$, $\dot{v}_1^{2-,3-}$, $\dot{v}_1^{2+,3+}$, $\dot{v}_1^{2-,4+}$, in subset 1 to be compared with $\dot{v}_1$; and $\dot{v}_2^{1+,3-}$, $\dot{v}_2^{1+,3+}$, $\dot{v}_2^{1-,3+}$, $\dot{v}_2^{1-,3-}$, $\dot{v}_2^{1+,4+}$, $\dot{v}_2^{1-,4+}$, $\dot{v}_2^{2-,3-}$, $\dot{v}_2^{2+,3+}$, $\dot{v}_1^{2-,4+}$ in subset 2 to be compared with (6) Four decoupled SISO controllers 164 for constraint outputs tracking which receive constraint output tracking errors (lim $y_{ci} - y_{ci}$, i=1, 2, 3, 4) and shape desired constraint tracking responses, respectively; same constraint with different limits as reference inputs will use the same constraint decoupled SISO controller.

(7) One selection logic 150 for subset 1 and one selection logic 150 for subset 2. Each compares the pseudo inputs generated by the given subset of constraints and the pseudo input generated by the primary controlled output associated with that subset, selects the most limiting constraint for each subset, and determines the final pseudo input to go into the SISO Lead/Lag 152 and MIMO Primary Decoupling Controller 140.

(8) Three common SISO integrators 142 which are not individually shown in FIG. 2 due to limited space. Each integrator works for each decoupled primary SISO loop, generates each $\dot{u}_i$ from each $\ddot{u}_i$, i=1, 2, 3, and passes it to each control handle—actuator inner loop as input command reference accordingly, each integrator is dynamically saturated with the max/min operating range of a given actuator. The integrator 142 is shown in FIG. 3.

The common SISO integrator 142 is shown in FIG. 3. (1) Calculate: $\ddot{u}_k = \ddot{\tilde{u}}_k + \ddot{u}_{k-1}$ according to the perturbation definition; (2) Apply the max/min operating rate limits to $\ddot{u}_k$; (3) Calculate current step command change: $\Delta u_k = T_s \cdot \ddot{u}_k$, where $T_s$ is the sampling time; (4) Calculate current step command: $u_k = \Delta u_k + u_{k-1}$; (5) Apply the max/min operating limits $u_k$ as shown in FIG. 4.

Technically, the current approach overcomes the fundamental, longstanding MIMO mode selection challenge of selecting between multiple sets of control modes due to the coupled and confounded set of input variables associated with a coupled complex plant process (for example, a typical gas turbine engine processes). The pseudo inputs from the new controlled plant resulted from the primary control provide MIMO mode selection criteria which have a direct, one-to-one correspondence from a given constraint to the specific performance trade-off decision according to pre-determined rules. This solution preserves SISO-type mode selection simplicity even with high dimension constraints systems. It allows a simple SISO constraint controller or certain simple SISO constraint controllers, selected from multiple constraints, that reconfigure the existing primary MIMO control online by replacing the traded-off output with the selected constraint when a single subset is active or replacing the traded-off outputs with the selected constraints when multiple subsets are active. The resultant design has explicit physical meaning, is simple, deterministic, fundamentally robust, and easily maintainable.

It is to be understood the control system architectures disclosed herein may be provided in any manner known to those of ordinary skill, including software solutions, hardware or firmware solutions, and combinations of such. Such solutions would incorporate the use of appropriate processors, memory (and software embodying any algorithms described herein may be resident in any type of non-transitory memory), circuitry and other components as is known to those of ordinary skill.

Having disclosed the inventions described herein by reference to exemplary embodiments, it will be apparent to those of ordinary skill that alternative arrangements and embodiments may be implemented without departing from the scope of the inventions as described herein. Further, it will be understood that it is not necessary to meet any of the objects or advantages of the invention(s) stated herein to fall within the scope of the inventions, because undisclosed or unforeseen advantages may exist.

What is claimed is:

1. A control system for a physical plant, comprising:
   an integral action control unit providing control signals for a physical plant;
   a multiple-input-multiple-output (MIMO) primary decoupling controller decoupling controlled outputs from one another and shaping pseudo inputs/controlled outputs desired plant dynamics and providing control command derivatives to the integral action control unit and thereby forming at least part of a new controlled plant; and
   a multiple-input-multiple-output (MIMO) constraint decoupling controller decoupling constraint outputs from one another and from non-traded off controlled output(s) and shaping pseudo inputs/constraint outputs desired plant dynamics and providing pseudo inputs to the new controlled plant, and wherein the MIMO constraint decoupling controller decouples constraint outputs from one another, and decouples the constraints from the non-traded off primary controlled outputs.

2. The control system of claim 1, further comprising a selection logic section for selecting pseudo inputs for the primary decoupling controller from the pseudo inputs calculated by the MIMO constraint decoupling controller and the pseudo inputs calculated by the controlled output tracking controllers based on primary decoupling control.

3. The control system of claim 2, further comprising a set of decoupled single-input-single-output (SISO) controlled output tracking controllers receiving controlled output tracking error signals and providing pseudo input signals to the new controlled plant.

4. The control system of claim 3, wherein the selection logic compares the pseudo inputs from the MIMO constraint decoupling controller and the pseudo inputs from the SISO controlled output tracking controllers and selects the most limiting constraint for each primary SISO control loop and provides them to the (SISO) lead/lag controllers.

5. The control system of claim 1, further comprising a set of single-input-single-output (SISO) lead/lag controllers to extend the bandwidths of decoupled primary SISO control loops, providing v-dot-star to the primary decoupling controller.

6. The control system of claim 1, wherein the MIMO constraint decoupling controller decouples the constraints from the non-traded off primary controlled outputs by rejecting non-traded off primary controlled outputs as known disturbance inputs.

7. The control system of claim 1, further comprising a set of single-input-single-output (SISO) constraint output tracking controllers that receive constraint output tracking errors from the physical plant and shape desired constraint responses and provide the inputs to the MIMO constraint decoupling controller.

8. The control system of claim 7, wherein the constraint output tracking errors are determined, at least in part, based upon the differences between predetermined constraint limits and constraint outputs.

9. A method for multiple variable control of a physical plant with high dimensions multiple constraints, comprising the steps of:
   utilizing a control unit for controlling a physical plant with multiple inputs and multiple primary controlled outputs and high dimension multiple constraints;
   decoupling the multiple primary controlled outputs from one another and shaping pseudo inputs/controlled outputs desired plant dynamics;
   decoupling the multiple constraints from one another;

decoupling the multiple constraints from non-traded off primary controlled outputs;

shaping pseudo inputs/constraint outputs desired plant dynamics; and selecting the most limiting constraints for the pseudo input entries.

10. The method of claim 9, wherein the step of decoupling the multiple controlled outputs involves a multi-input-multi-output (MIMO) primary decoupling controller.

11. The method of claim 9, wherein the step of decoupling the multiple constraints involves a multi-input-multi-output (MIMO) constraint decoupling controller.

12. The method of claim 9, wherein the step of selecting the most limiting constraints involves a selection logic.

13. The method of claim 12, wherein the selection logic comparing the pseudo inputs generated by given subsets of constraints and the pseudo inputs generated by the primary controlled outputs associated with those subset, respectively, and selecting the most limiting constraint for each subset based, at least in part, on those comparisons.

14. The method of claim 12, wherein the Selection Logic determining the most limiting constraint for each subset based on pre-determined rules and managing the constraint active/inactive transitions cross subsets and providing smooth pseudo inputs to the MIMO primary decoupling controller.

15. The method of claim 9, wherein the MIMO primary decoupling controller provides decoupled control using dynamics inversion.

16. The method of claim 9, further comprising a step of extending the bandwidths of decoupled primary control loops using a set of single-input-single-output (SISO) lead/lag controllers upstream of the MIMO primary decoupling controller.

17. The method of claim 9, wherein the step of decoupling the multiple constraints from non-traded off primary controlled outputs includes a step of rejecting the non-traded off primary controlled outputs as known disturbance inputs.

* * * * *

UNITED STATES PATENT AND TRADEMARK OFFICE
CERTIFICATE OF CORRECTION

PATENT NO. : 9,081,378 B2
APPLICATION NO. : 13/660005
DATED : July 14, 2015
INVENTOR(S) : Lu et al.

Page 1 of 2

It is certified that error appears in the above-identified patent and that said Letters Patent is hereby corrected as shown below:

In the Specification

In Column 6, Line 27, delete "$\dot{\tilde{u}} = \dot{u}_j - \dot{u}_{k-1}$" and insert -- $\tilde{u}_j = \dot{u}_j - \dot{u}_{k-1}$ --, therefor.

In Column 6, Line 48, delete "$\dot{\tilde{u}}_k$ ()." and insert -- $\tilde{u}_k = 0$ --, therefor.

In Column 6, Line 62, delete "$\tilde{x}(k+1) = A\tilde{x}(k) + B\dot{\tilde{u}}(k) + B_d\tilde{d}(k) + F_k$" and insert -- $\tilde{x}(k+1) = A\tilde{x}(k) + B\tilde{u}(k) + B_d\tilde{d}(k) + F_k$ --, therefor.

In Column 6, Line 67, delete "$\dot{\tilde{u}} \in R^{m \times 1}$," and insert -- $\tilde{u} \in R^{m \times 1}$, --, therefor.

In Column 7, Line 27, delete "$\dot{\tilde{u}}$" and insert -- $\tilde{u}$ --, therefor.

In Column 10, Line 31, delete "$E\dot{\tilde{u}}$" and insert -- $E\tilde{u}(k)$ --, therefor.

In Column 11, Line 67, delete "$\tilde{y}_{c1}(k+1)) + k_{1,0}(\hat{y}_{c1}(k) - \tilde{y}_{c1}(k))$," and insert -- $\tilde{y}_{c1}(k+1)) + k_{c1,0}(\hat{y}_{c1}(k) - \tilde{y}_{c1}(k))$ --, therefor.

In Column 17, Line 58, delete "y₂-subset" and insert -- y₂-subset, --, therefor.

Signed and Sealed this
Twenty-third Day of August, 2016

Michelle K. Lee
*Director of the United States Patent and Trademark Office*

CERTIFICATE OF CORRECTION (continued)
U.S. Pat. No. 9,081,378 B2

In Column 17, Line 59, delete "$\dot{V}_2^{y_2} \leq 0,$" and insert -- $\dot{v}_2^{y_2} > 0$, --, therefor.

In Column 18, Line 11, delete "$\hat{V}_2^{2-3-}),$" and insert -- $\dot{v}_2^{2-3-}),$ --, therefor.

In Column 20, Line 10, delete "Y" and insert -- y --, therefor.

In Column 20, Line 11, delete "Y" and insert -- y --, therefor.

In Column 20, Line 64, delete "with" and insert -- with $\dot{v}_2$. --, therefor.

In Column 21, Line 16, delete "$\dot{u}_i$," and insert -- $u_i$ --, therefor.

In Column 21, Line 22, delete "$\dot{\hat{u}}_k = \dot{\tilde{u}}_k + \dot{u}_{k-1}$" and insert -- $\dot{\hat{u}}_k = \dot{\tilde{u}}_k + \dot{u}_{k-1}$ --, therefor.

In Column 18, Line 50, delete "$\dot{\hat{v}}_1 = \dot{v}_1^{y_1}$" and insert -- $\dot{\hat{v}}_1 = \dot{v}_1^{y_1}$ --, therefor.